United States Patent
Yagi et al.

(10) Patent No.: US 6,678,466 B2
(45) Date of Patent: *Jan. 13, 2004

(54) OPTICAL DISC, OPTICAL DISC RECORDING APPARATUS, AND OPTICAL DISC RECORDING METHOD FOR FACILITATING DUBBING, STORAGE MEDIUM FOR STORING OPTICAL DISC RECORDING PROGRAM FOR FACILITATING DUBBING, OPTICAL DISC REPRODUCING APPARATUS, AND OPTICAL DISC REPRODUCING METHOD

(75) Inventors: Tomotaka Yagi, Nishinomiya (JP); Katsuhiko Miwa, Moriguchi (JP); Tomoyuki Okada, Katano (JP); Kazuhiro Tsuga, Takarazuka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/154,920

(22) Filed: May 28, 2002

(65) Prior Publication Data

US 2002/0141738 A1 Oct. 3, 2002

Related U.S. Application Data

(62) Division of application No. 09/672,779, filed on Sep. 29, 2000, now Pat. No. 6,404,980, which is a division of application No. 09/210,948, filed on Dec. 15, 1998, now Pat. No. 6,393,206.

(30) Foreign Application Priority Data

Dec. 15, 1997 (JP) ............................................. 9-344874
Oct. 20, 1998 (JP) ........................................... 10-298214

(51) Int. Cl.[7] ................................................ H04N 5/91
(52) U.S. Cl. .......................... 386/95; 386/105; 386/126
(58) Field of Search ............................... 386/46, 95, 96, 386/98, 104, 105, 111, 112, 125, 126, 52, 54

(56) References Cited

U.S. PATENT DOCUMENTS

| | | | |
|---|---|---|---|
| 5,642,459 A | 6/1997 | Arano et al. | |
| 5,771,334 A | 6/1998 | Yamauchi et al. | |
| 5,907,659 A | 5/1999 | Yamauchi et al. | |
| 6,108,486 A | 8/2000 | Sawabe et al. | |
| 6,285,825 B1 | 9/2001 | Miwa et al. | |
| 6,404,980 B1 * | 6/2002 | Yagi et al. | ..................... 386/95 |

FOREIGN PATENT DOCUMENTS

| | | |
|---|---|---|
| EP | 0 635 835 | 1/1995 |
| EP | 0 644 692 | 3/1995 |

(List continued on next page.)

OTHER PUBLICATIONS

Uesaka, Y.: "DVD Authoring System", National Technical Report, vol. 42, No. 5, Oct. 1 1996, pp. 90–96, XP000618769, ISSN: 0028–0291 * the whole document*.

(List continued on next page.)

*Primary Examiner*—Huy Nguyen
(74) *Attorney, Agent, or Firm*—Wenderoth, Lind & Ponack, L.L.P.

(57) ABSTRACT

A recordable optical disc stores one or more video objects. A video stream, a first audio stream, and a second audio stream which is used for dubbing are multiplexed into each video object. Also, an optical disc recording apparatus generates the second audio stream by an audio stream generating device, and multiplexes the generated second audio stream into each video object together with the video object and the first audio stream by a multiplexor. The generated video objects are recorded onto the recordable optical disc by a recording device. The optical disc in which such video objects are stored facilitates dubbing.

3 Claims, 36 Drawing Sheets

FOREIGN PATENT DOCUMENTS

| | | |
|---|---|---|
| EP | 0 737 975 | 10/1996 |
| EP | 0 777 229 | 6/1997 |
| EP | 0 800 164 | 10/1997 |
| EP | 0 855 714 | 7/1998 |
| EP | 0 877 377 | 11/1998 |
| JP | 08329661 A | 12/1996 |

OTHER PUBLICATIONS

Ryu, S.W. et al.: "A Hierarchichal Layered Model for DVD Authoring System", IEEE Transactions on Consumer Electronics, vol. 42, No. 3, Aug. 1, 1996, pp. 814–819, XPOOO644958, USA, ISSN: 0098–3063 *the whole document*.

Patent Abstracts of Japan, vol. 098, No. 010, Aug. 31, 1998 & JP 10 126739 A (Kenwood Corp.), May 15, 1998 *abstract*.

Anonymous: "Hard Disk Cache Alterations for Digital Versatile/Video Disks", IBM Technical Disclosure Bulletin, vol. 40, No. 3, Mar. 1997, p. 165/166 166 XPOO210335, ISSN: 0018–8689 * the whole document *.

* cited by examiner

FIG. 3A
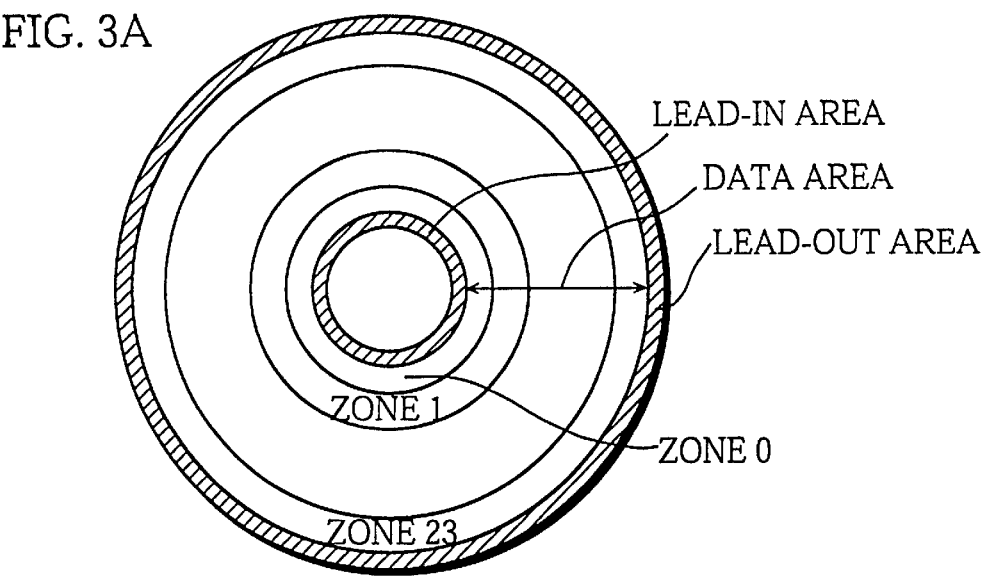
FIG. 3B
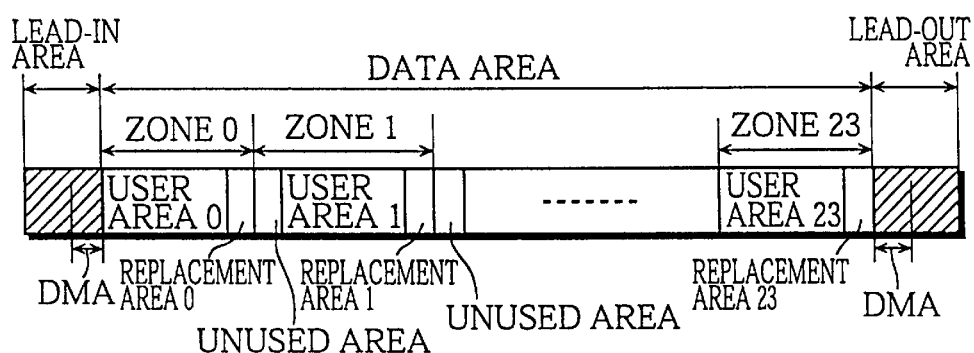
FIG. 3C
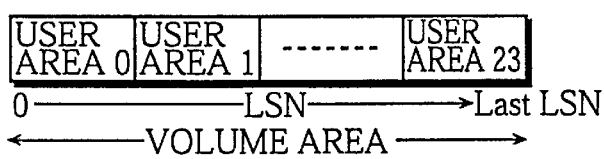
FIG. 3D
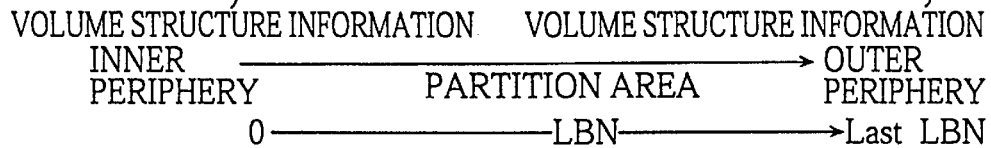

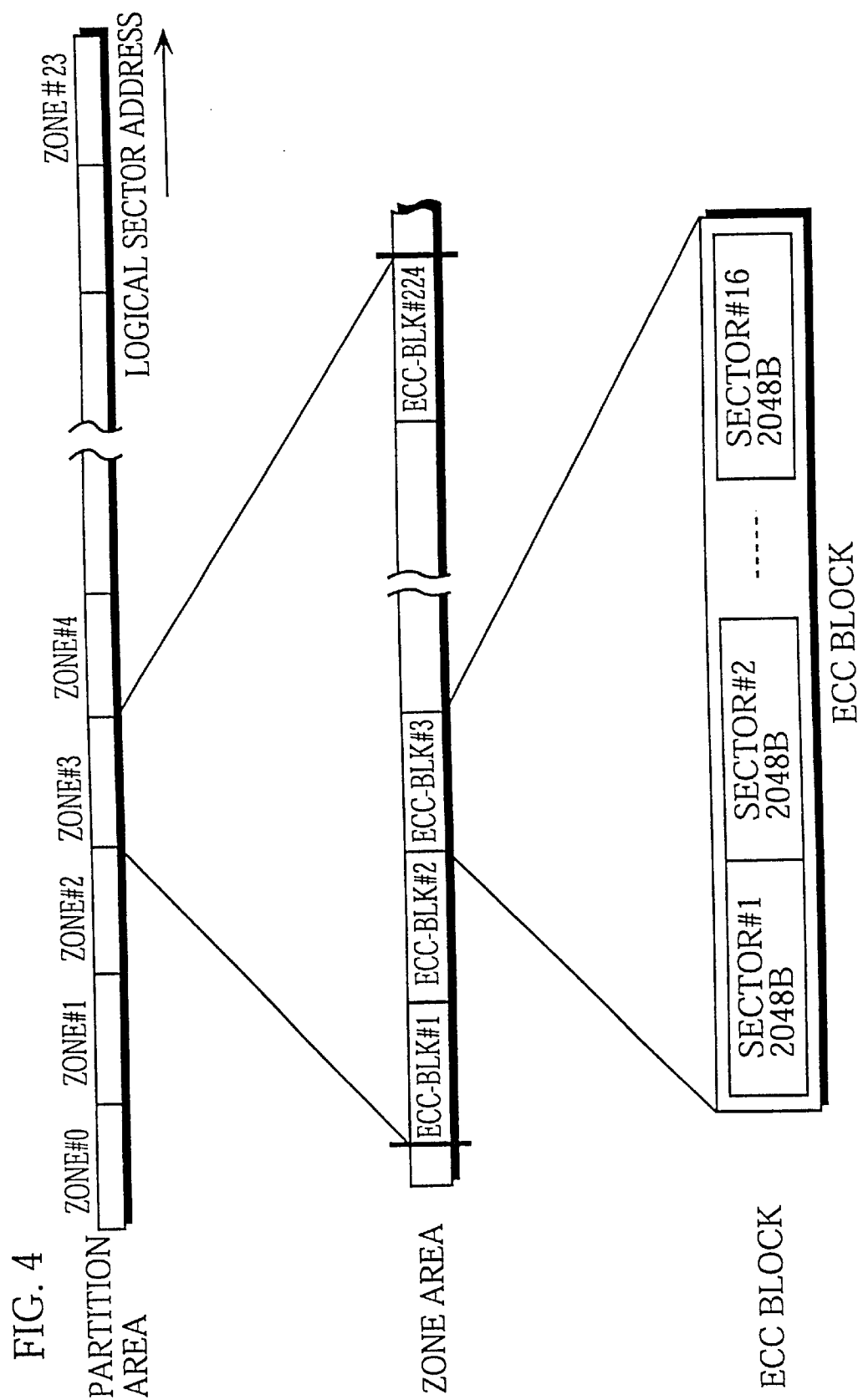

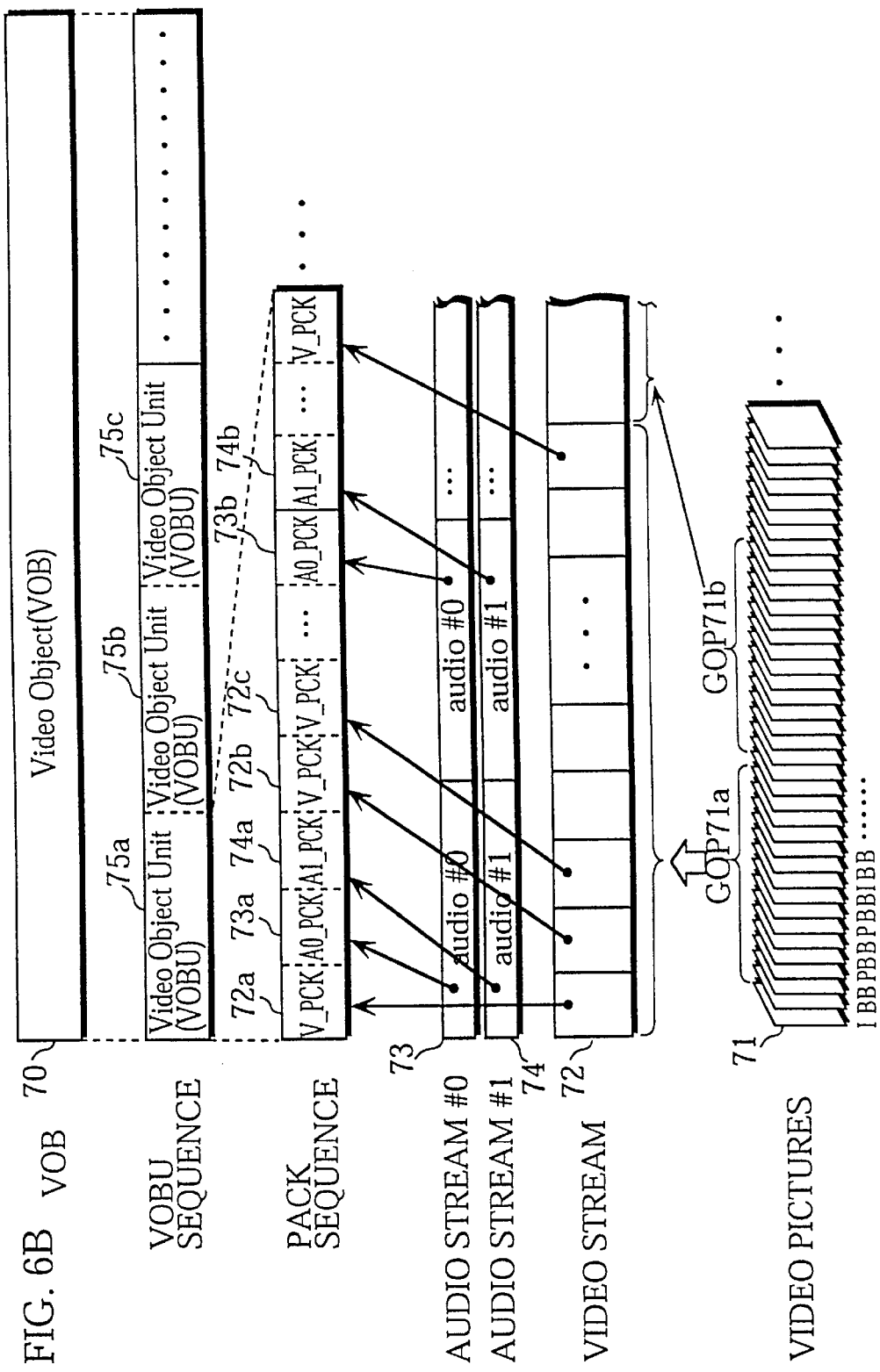

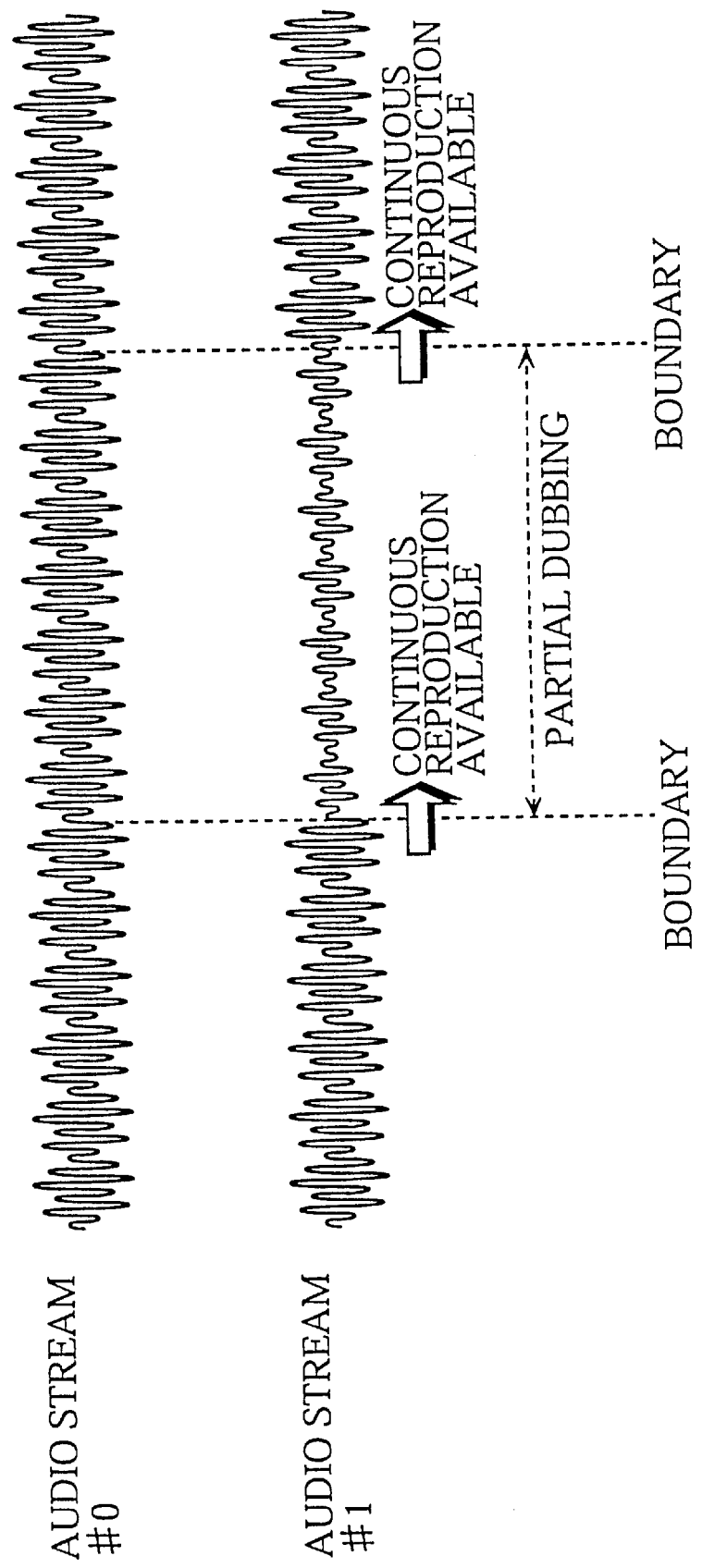

FIG. 29

| | T1 | Ta (T2) | Tb (T3, T4) | Tc (T5, T6) | Td (T7, T8) | ... T8 ... |
|---|---|---|---|---|---|---|
| SWITCH 3d | 1 | 3 | 2, 1 | 4, 3 | 2, 1 | 4 |
| SWITCH 3e DECODER 4 SIDE | | 1 | 3 | 1 | 3 | |
| SWITCH 3e ENCODER 2 SIDE | | 2 | 4 | 2 | 4 | |

"1" TO "4" RESPECTIVELY REPRESENT TB1 TO TB4

OPTICAL DISC, OPTICAL DISC RECORDING APPARATUS, AND OPTICAL DISC RECORDING METHOD FOR FACILITATING DUBBING, STORAGE MEDIUM FOR STORING OPTICAL DISC RECORDING PROGRAM FOR FACILITATING DUBBING, OPTICAL DISC REPRODUCING APPARATUS, AND OPTICAL DISC REPRODUCING METHOD

This is a Rule 1.53(b) Divisional application of Ser. No. 09/672,779, filed Sep. 29, 2000, U.S. Pat. No. 6,404,980, which is a Rule 1.53(b) Divisional application of Ser. No. 09/210,948, filed Dec. 15, 1998, U.S. Pat. No. 6,393,206.

BACKGROUND OF THE INVENTION (1) Field of the Invention

This invention generally relates to a rewriteable optical disc, an optical disc recording apparatus, an optical disc recording method, and a storage medium for storing an optical disc recording program, and specifically to a rewriteable optical disc, an optical disc recording apparatus, and an optical disc recording method for facilitating dubbing, and a storage medium for storing an optical disc recording program for facilitating dubbing.

(2) Description of the Prior Art

Recently, DVD(Digital Video/Versatile Disc)-RAM, one of rewriteable optical discs, has been commercialized. The DVD-RAM is a phase-change-type disc having a capacity of several giga bytes. Now that MPEG and MPEG2, standards for compressing/encoding AV (Audio Visual) data, have gone into practical use, it is expected that the DVD-RAM will be used not only in computers but as an AV recording/reproducing medium. That is, the widespread expectation is that the DVD-RAM will be prevalent and replace the magnetic tape which has been a major AV recording/reproducing medium.

It is possible for users to record data onto DVD-RAMs while this is not possible with read-only DVDs (hereinafter referred to as DVD-ROMs). As a result, it is expected that DVD-RAMs provide a wide range of uses.

However, it is not so easy to perform dubbing on conventional optical discs as on the magnetic tapes.

The magnetic tapes have independent areas for recording video tracks and audio tracks. Also, video data and audio data are read/written from/onto the magnetic tapes via respectively independent magnetic heads. Accordingly, it is very easy to perform dubbing of audio data on the magnetic tapes. In case of analog video tape recorders, the time (delay) taken for starting reproducing audio or video data read from the magnetic tape via the head is nearly zero. This is the same for the time (delay) taken for starting writing input audio or video data onto the magnetic tape via the head. As a result, data can be recorded onto the magnetic tape at the same time as the data having been recorded on the magnetic tape is reproduced.

In contrast, in case of an optical disc, the video stream and audio stream are multiplexed into one MPEG stream to be recorded onto the disc. Also, only one pickup is used for both reading and writing data from/onto the optical disc. In the MPEG stream, the video stream is placed before and is processed earlier than the audio stream. This is because the amount of video data to be decoded is greater than that of audio data. Such data structure of the MPEG stream and the construction of the recording/reproducing apparatus make it difficult to perform dubbing to record dubbed data onto the optical disc.

SUMMARY OF THE INVENTION

It is therefore an object of the present invention to provide an optical disc which allows the dubbing to be performed as easily as magnetic tape medium, and an optical disc recording apparatus, an optical disc reproducing apparatus, and a program storage medium storing a program executed in the optical disc recording apparatus.

The above object is fulfilled by a recordable optical disc comprising: a data area in which one or more video objects are recorded, where a video stream, a first audio stream, and a second audio stream are multiplexed into the one or more video objects, the second audio stream being used for dubbing.

With the above-stated construction, it is possible to perform dubbing easily since the second audio stream for dubbing is recorded beforehand in the video objects. It is also possible to record the dubbing audio data together with the original audio data (the first audio stream) since the first and second audio streams are separately recorded.

As a result, it is possible to achieve new applications (e.g., applications for practicing pronunciation of some language and applications including dubbings for Karaoke) which have not been achieved conventionally in recordable optical discs. It is also possible to repeatedly record the dubbing while maintaining the original audio data.

In the above recordable optical disc, the second audio stream for dubbing may have the same reproduction time period as that of the first audio stream.

With such a construction, it is possible to ensure that the first audio stream is dubbed onto the second audio stream over the entire reproduction period.

In the above recordable optical disc, the second audio stream for dubbing may be recorded with the same bit rate as the first audio stream.

With such a construction, it is possible to ensure that the second audio stream for dubbing has the same audio quality as the first audio stream. This is achieved, for example, by using the same encoding mode and the same sampling frequency for the second audio stream as the first audio stream.

In the above recordable optical disc, the second audio stream for dubbing may include audio data which has been generated from the same source as the first audio stream.

With such a construction, the second audio stream for dubbing has the same source as the first audio stream. This enables the audio stream to be used for the performance of a partial dubbing. Furthermore, the second audio stream having had partial dubbing performed includes the same audio data as the first audio stream in a part other than the part in which the dubbing data is recorded. Therefore, the reproducing apparatus needs not switch between the first and second audio streams during the reproduction.

In the above recordable optical disc, the first audio stream may include a plurality of packs which each have a predetermined size, and the second audio stream may include a plurality of packs respectively corresponding to the plurality of packs included in the first audio stream.

Also, in the above recordable optical disc, each of the plurality of packs in the second audio stream may include the same audio data as that included in a corresponding one of the plurality of packs in the first audio stream.

With such a construction, the second audio stream for dubbing corresponds to the first audio stream in units of packs and has the same audio data. As a result, in addition to the above-described partial dubbing, it is possible to return the second audio stream to the state before dubbing. This is achieved by copying the audio data of packs of the first audio stream to the corresponding packs of the second audio stream.

The above recordable optical disc may further comprise: a management area for storing one or more pieces of management information which respectively correspond to the one or more video objects, each of the one or more pieces of management information shows a state of the second audio stream in a corresponding video object and indicates whether dubbing has been performed on the second audio stream in the corresponding video object.

With the above construction, it is possible for the recording apparatus and the reproducing apparatus to manage whether the dubbing stream has had dubbing performed by referring to the management information.

In the above recordable optical disc, each of the one or more pieces of management information may further indicate one of a first state, a second state, and a third state, where the first state indicates that the second audio stream includes the same audio data as the first audio stream, the second state indicates that the second audio stream includes audio data which has been generated from the same source as the first audio stream, and the third state indicates that audio data of the second audio stream is irrelevant to audio data of the first audio stream.

With such a construction, it is possible for the recording apparatus and the reproducing apparatus to manage the state of the dubbing stream by referring to the management information.

The above object is also fulfilled by a recordable optical disc comprising: a data area in which one or more video objects are recorded, where a plurality of elementary streams are multiplexed into the one or more video objects, where one of the plurality of elementary streams is a video stream and another one is a dubbing stream which is used for dubbing either of audio data and sub-picture data; and a management area for storing one or more pieces of management information which respectively correspond to the one or more video objects, each of the one or more pieces of management information shows a state of the dubbing stream in a corresponding video object.

With the above construction, the dubbing stream is multiplexed into the video objects beforehand, and an area is secured in the dubbing stream so that either audio data or sub-picture data is recorded in the area. This facilitates the dubbing. Furthermore, it is possible for the recording apparatus and the reproducing apparatus to manage whether the dubbing stream has had dubbing performed by referring to the management information.

In the above recordable optical disc, the dubbing stream may be used for dubbing the sub-picture data representing one or more still pictures, each of the one or more video objects includes a plurality of video object units, and each of the plurality of video object units includes a part of the video stream corresponding to a predetermined reproduction time period and includes a part of the dubbing stream which is to be reproduced together with the part of the video stream, where the part of the dubbing stream corresponds to at least one still picture, and each of the one or more pieces of management information indicates whether dubbing has been performed on the dubbing stream in the corresponding video object.

Also, in the above recordable optical disc, the part of the dubbing stream included in each video object unit may correspond to a still picture having a predetermined size.

With the above construction, it is possible to easily dub at least one still picture into each video object unit.

The above object is also fulfilled by an optical disc recording apparatus for recording one or more video objects onto an optical disc, where each of the one or more video objects includes a video stream, a first audio stream and a second audio stream, the optical disc recording apparatus comprising: an input unit for receiving the video stream and the first audio stream; an audio stream generating unit for generating, based on the received first audio stream, a second audio stream which is used for dubbing; a multiplexing unit for generating the one or more video objects by multiplexing the generated second audio stream, the received video stream, and the received first audio stream into the one or more video objects; and a recording unit for recording the generated one or more video objects onto the optical disc.

With the above construction, the second audio stream for dubbing is multiplexed into the video objects beforehand during the first recording onto the optical disc. As a result, it is possible to generate an optical disc in which video objects facilitating the dubbing are recorded beforehand. It is also possible to record the dubbing audio data together with the original audio data (the first audio stream) since the first and second audio streams are separately recorded.

In the above optical disc recording apparatus, the first audio stream received by the input unit may include packs which each have a fixed size, and the audio stream generating unit includes: a buffer for sequentially storing packs included in the received first audio stream; and a control unit for performing a control so that the packs stored in the buffer are output to be included in the second audio stream.

Also, in the above optical disc recording apparatus, each pack may include a time stamp and a stream identifier, the time stamp specifying a time at which each pack is output from a track buffer of a reproducing apparatus, and the control unit updates time stamps and stream identifiers of the packs stored in the buffer.

With the above construction, it is possible to generate the second audio stream for dubbing by copying each pack of the first audio stream almost as it is. This relieves the optical disc recording apparatus of having an audio encoder for generating the second audio stream for dubbing.

The above optical disc recording apparatus may further comprise: a reading/writing unit for reading a video object from the optical disc; a first buffer unit including a first reading buffer and a first writing buffer, the first reading buffer storing a part of the read video object, and the first writing buffer storing a part of the read video object which is to be written onto the optical disc; a second buffer unit including a second reading buffer and a second writing buffer, the second reading buffer storing a part of the read video object, and the second writing buffer storing a part of the read video object which is to be written onto the optical disc; and a dubbing control unit for performing a control so that while the video object is either read from or written onto the optical disc using one of the first buffer unit and the second buffer unit, the second audio stream in the part of the video object stored in the reading buffer of the other one of the first buffer unit and the second buffer unit is updated, and the part of the video object including the updated second audio stream is stored in the writing buffer of the other buffer unit, where the reading/writing unit sequentially writes the part of the video object in the first writing buffer and the part of the video object in the second writing buffer onto the optical disc, where after the second audio stream has had dubbing performed, the dubbing control unit is capable of restoring the second audio stream to a state before the dubbing by copying the audio data of the first audio stream to the second audio stream.

With the above construction, the dubbing control unit alternately switches the first and second buffer units to read/write the optical disc or to perform the dubbing (update the second audio stream). This achieves the reproduction and dubbing performed in real time. Also, the second audio stream can easily be restored to the original state after dubbing is performed on the second audio stream.

In the above optical disc recording apparatus, the dubbing control unit may instruct the reading/writing unit to read a piece of management information corresponding to the video object read by the reading/writing unit, updates the read piece of management information so that the information indicates that dubbing has been performed on the video object, and instructs the reading/writing unit to write the updated piece of management information onto the optical disc.

With the above construction, it is possible to update the management information so that it indicates that dubbing has been performed on the dubbed video object.

The above object is also fulfilled by an optical disc recording apparatus for recording one or more video objects onto an optical disc, where each of the one or more video objects includes a video stream, the optical disc recording apparatus comprising: an input unit for receiving the video stream; a dubbing stream generating unit for generating a dubbing stream which is used for dubbing; a multiplexing unit for generating the one or more video objects by multiplexing the generated dubbing stream and the received video stream into the one or more video objects; a management information generating unit for generating one or more pieces of management information which respectively correspond to the one or more video objects, each of the one or more pieces of management information indicates whether dubbing has been performed on the dubbing stream in the corresponding video object; and a recording unit for recording the generated one or more video objects and the generated one or more pieces of management information onto the optical disc.

With the above construction, the optical disc recording apparatus multiplexes the dubbing stream into the video objects beforehand during the first recording onto the optical disc. As a result, it is possible to generate an optical disc in which video objects facilitating the dubbing of audio data or sub-picture data are recorded beforehand. Furthermore, it is possible for the recording apparatus and the reproducing apparatus to manage whether the dubbing stream has had dubbing performed by referring to the management information.

The above object is also fulfilled by a method for recording one or more video objects onto an optical disc, the method comprising: an obtaining step for obtaining a video stream and a first audio stream; an audio stream generating step for generating a second audio stream having a bit rate with which audio data corresponding to a reproduction time period of the first audio stream is recorded into the second audio stream; and a recording step for generating the one or more video objects by multiplexing the generated second audio stream, the obtained video stream, and the obtained first audio stream into the one or more video objects and recording the generated one or more video objects onto the optical disc.

With the above construction, the second audio stream for dubbing is multiplexed into the video objects beforehand during the first recording onto the optical disc. As a result, it is possible to generate an optical disc in which video objects facilitating the dubbing are recorded beforehand. It is also possible to record the dubbing audio data together with the original audio data (the first audio stream) since the first and second audio streams are separately recorded.

The above object is also fulfilled by a computer-readable storage medium storing a program for recording one or more video objects onto an optical disc, the program comprising: a program segment for instructing a computer to receive a video stream and a first audio stream; a program segment for instructing the computer to generate a second audio stream having a bit rate with which audio data corresponding to a reproduction time period of the first audio stream is recorded into the second audio stream; a program segment for instructing the computer to generate the one or more video objects by multiplexing the generated second audio stream, the received video stream, and the received first audio stream into the one or more video objects; and a program segment for instructing the computer to record the generated one or more video objects onto the optical disc.

With the above construction, a computer executing the program stored in the storage medium multiplexes the second audio stream for dubbing into the video objects beforehand during the first recording onto the optical disc. As a result, it is possible to generate an optical disc in which video objects facilitating the dubbing are recorded beforehand. It is also possible to record the dubbing audio data together with the original audio data (the first audio stream) since the first and second audio streams are separately recorded.

In the above computer-readable storage medium, the generated second audio stream may have the same audio data as the first audio stream.

Also, in the above computer-readable storage medium, the received first audio stream may include packs which each have a fixed size, and the audio stream generating program segment may instruct the computer to temporarily store packs included in the received first audio stream into a buffer in sequence, and instruct the computer to perform a control so that the packs stored in the buffer are output to be included in the second audio stream.

Also, in the above computer-readable storage medium, each pack may include a time stamp and a stream identifier, the time stamp specifying a time at which each pack is output from a track buffer of a reproducing apparatus, and the audio stream generating program segment instructs the computer to update time stamps and stream identifiers of the packs stored in the buffer.

With the above construction, it is possible for the computer executing the program stored in the storage medium to generate the second audio stream for dubbing by copying each pack of the first audio stream almost as it is.

The above computer-readable storage medium may further comprise: a program segment for instructing the computer to, after the second audio stream has had dubbing performed, restore the second audio stream to a state before the dubbing by copying the audio data of the first audio stream to the second audio stream.

With such a construction, the second audio stream can easily be restored to the original state after dubbing is performed on the second audio stream.

The above object is also fulfilled by an optical disc reproducing apparatus for reproducing an optical disc, where the optical disc includes: a data area in which one or more video objects are recorded, where a video stream, a first audio stream, and a second audio stream are multiplexed into the one or more video objects; and a management area for storing one or more pieces of management information which respectively correspond to the one or more video objects, where the second audio stream has a bit rate with which audio data corresponding to a reproduction time period of the first audio stream is recorded into the second audio stream, where each of the one or more pieces of management information further indicates one of a first state, a second state, a third state, and a fourth state, where the first state indicates that the second audio stream includes the same audio data as the first audio stream, the second state indicates that the second audio stream includes audio data which has been generated from the same source as the first audio stream, the third state indicates that audio data of the second audio stream is irrelevant to audio data of the first audio stream, and the fourth state indicates that the second audio stream has had dubbing performed, the optical disc reproducing apparatus comprising: a reading unit for reading a video object and a piece of management information corresponding to the video object from the optical disc; a reproducing unit for reproducing the video stream and the first audio stream included in the read video object; a control unit for controlling the reproducing unit so that when the piece of management information indicates the fourth state, the reproducing unit is allowed to change reproductions of the first audio stream and the second audio stream in accordance with an instruction to change audio streams input from a user, and that when the piece of management information indicates either of the first state and the second state, the reproducing unit is not allowed to change reproductions of the first audio stream and the second audio stream even when the instruction is input from the user, and the reproducing unit notifies the user that audio streams cannot be changed.

With the above construction, the control unit controls the reproducing unit so that when the optical disc has had dubbing performed (third state), the reproducing unit changes reproductions of the first audio stream and the second audio stream in accordance with an instruction from a user, and that when the dubbing has not been performed on the optical disc (first or second state), it notifies the user that audio streams cannot be changed. That is, the optical disc reproducing apparatus cautions the user that audio streams cannot be changed since dubbing has not been performed yet. The user is notified so for the following reason. If the first audio stream is changed to the second audio stream when the dubbing has not been performed on the optical disc (first or second state), the user may misunderstand the operation thinking that the reproducing apparatus has broken down and failed to change the audio streams since the user will hear the same sound.

The above object is also fulfilled by an optical disc reproducing method for reproducing an optical disc, where the optical disc includes: a data area in which one or more video objects are recorded, where a video stream, a first audio stream, and a second audio stream are multiplexed into the one or more video objects; and a management area for storing one or more pieces of management information which respectively correspond to the one or more video objects, where the second audio stream has a bit rate with which audio data corresponding to a reproduction time period of the first audio stream is recorded into the second audio stream, where each of the one or more pieces of management information further indicates one of a first state, a second state, a third state, and a fourth state, where the first state indicates that the second audio stream includes the same audio data as the first audio stream, the second state indicates that the second audio stream includes audio data which has been generated from the same source as the first audio stream, the third state indicates that audio data of the second audio stream is irrelevant to audio data of the first audio stream, and the fourth state indicates that the second audio stream has had dubbing performed, the optical disc reproducing method comprising: a reading step for reading a video object and a piece of management information corresponding to the video object from the optical disc; a reproducing step for reproducing the video stream and the first audio stream included in the read video object; a control step for, when the piece of management information indicates the fourth state, allowing the reproducing step to change reproductions of the first audio stream and the second audio stream in accordance with an instruction to change audio streams input from a user, and that when the piece of management information indicates either of the first state and the second state, not allowing the reproducing step to change reproductions of the first audio stream and the second audio stream even when the instruction is input from the user, and the reproducing step notifies the user that audio streams cannot be changed.

With the above construction, the optical disc reproducing method cautions the user that audio streams cannot be changed since dubbing has not been performed yet. The user is notified so for the following reason. If the first audio stream is changed to the second audio stream when the dubbing has not been performed on the optical disc (first or second state), the user may misunderstand the operation thinking that the reproducing apparatus has broken down and failed to change the audio streams since the user will hear the same sound.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3A shows the plurality of zone areas provided on a DVD-RAM;

FIG. 3B shows a horizontal arrangement of the lead-in area, the lead-out area, and the zone area 0–23 that were shown in FIG. 3A;

FIG. 3C shows logical sector numbers (LSNs) in the volume area;

FIG. 3D shows logical block numbers (LBNs) in the volume area;

FIG. 4 shows a hierarchical relation between zone areas, ECC blocks, and sectors;

FIG. 6B shows a structure of VOB in which elementary streams are multiplexed;

FIG. 7 shows boundaries generated in the audio stream #1 when a partial dubbing is performed on the audio stream #1;

FIG. 29 shows the control of the switches 3d and 3e shown in FIG. 21 performed by the control unit 1 with the timing shown in FIG. 27;

DESCRIPTION OF THE PREFERRED EMBODIMENTS

<First Embodiment>
<1 Construction of Optical Disc>
<1-1 Physical Structure of Recordable Optical Disc>

Figure 1:
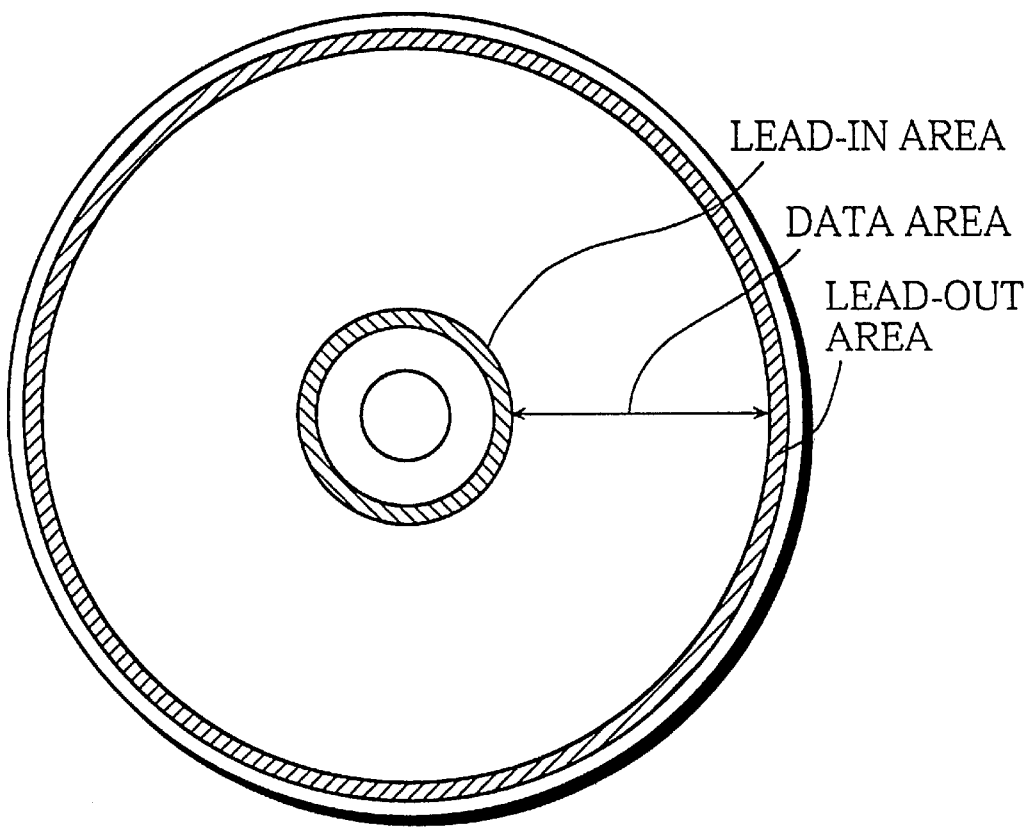
FIG. 1 shows the appearance and the recording area of a DVD-RAM disc which is a recordable optical disc described as an embodiment of the present invention.

FIG. 1 shows the appearance and the recording area of a DVD-RAM disc which is a recordable optical disc described as an embodiment of the present invention. As shown in the figure, the DVD-RAM disc has a lead-in area at its innermost periphery and a lead-out area at its outermost periphery, with the data area in between.

The lead-in area records the necessary reference signals for the stabilization of a servo of a recording/reproducing apparatus and also records identification signals used to prevent confusion with other media.

The lead-out area records the same type of reference signals as the lead-in area.

The data area, meanwhile, is divided into sectors which are the smallest unit by which the DVD-RAM can be accessed. Here, the size of each sector is set at 2 KB. The data recorded in the data area includes file system management information, AV data, AV data management file, and non-AV data.

The file system management information includes a directory structure of the DVD-RAM disc, positions of the recorded files, and information of the state of data area assignment. The file system management information is used when files are created, written, read, or deleted.

The AV data is recorded in units of files which respectively correspond to Video OBjects (VOBs). Each VOB is recorded into the disc by an optical disc recording apparatus in one consecutive recording. The contents of the VOBs are, for example, a whole or a part of a movie, or a whole or a part of a TV program.

The non-AV data is data other than AV data and is recorded in units of files.

Figure 2:
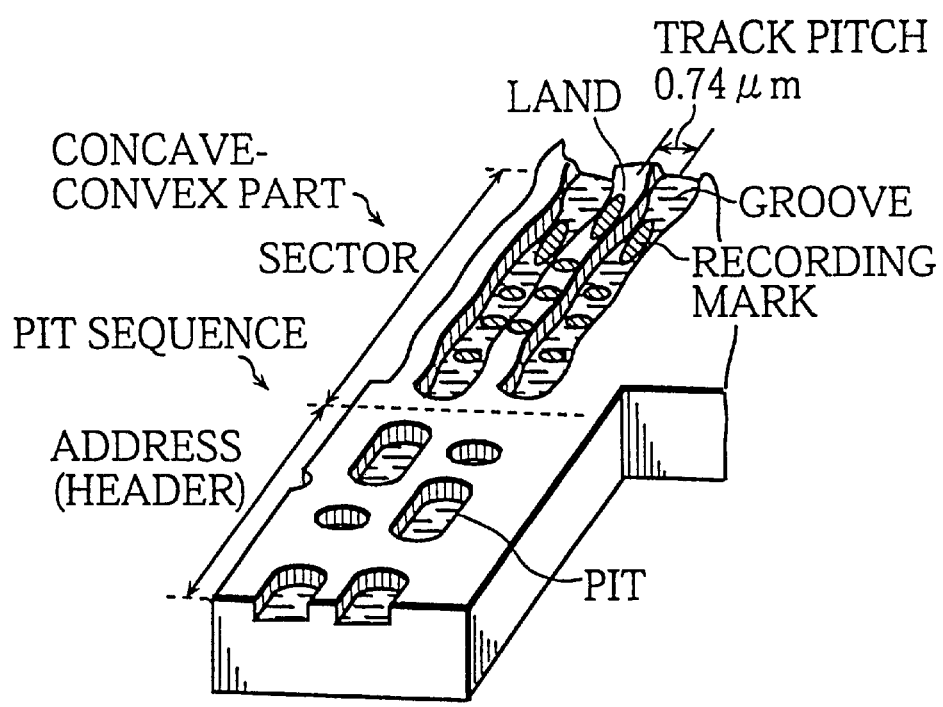
FIG. 2 shows the cross-section and surface of a DVD-RAM cut at the header of a sector.

FIG. 2 shows the cross-section and surface of a DVD-RAM cut at the header of a sector. As shown in the figure, each sector is composed of a pit sequence that is formed in the surface of a reflective film, such as a metal film, and an uneven part.

The pit sequence is composed of 0.4 $\mu$m~1.87 $\mu$m pits that are carved into the surface of the DVD-RAM to show the sector address.

The uneven part is composed of a concave part called a "groove" and a convex part called a "land". Each groove and land has a recording mark composed of a metal film capable of phase change attached to its surface. Here, the expression "capable of phase change" means that the recording mark can be in a crystalline state or a non-crystalline state depending on whether the metal film has been exposed to a light beam. Using this phase change characteristic, data can be recorded into this uneven part. While it is only possible to record data onto the land part of an MO (Magnetic-Optical) disc, data can be recorded onto both the land and the groove parts of a DVD-RAM, meaning that the recording density of a DVD-RAM exceeds that of an MO disc.

Error correction process is performed for each group of 16 sectors. In the present embodiment, each group of 16 sectors that is given an ECC (Error Correcting Code) is called an ECC block.

On a DVD-RAM, the data area is divided into a plurality of zone areas so that recording/reproducing apparatuses can realize rotation control called Z-CLV (Zone-Constant Linear Velocity) during recording and reproduction.

FIG. 3A shows the plurality of zone areas provided on a DVD-RAM.

As shown in the figure, a DVD-RAM is divided into 24 zone areas numbered zone 0 to zone 23. Each zone area is a group of tracks that are accessed using the same angular velocity. In this embodiment, each zone area contains 1888 tracks. The rotational angular velocity of the DVD-RAM is set separately for each zone area, with this velocity being higher the closer a zone area is located to the inner periphery of the disc. This ensures that the optical pickup can move at a constant velocity while performing access within a single zone area. By doing so, the recording density of DVD-RAM is raised, and rotation control is made easier during recording and reproduction.

FIG. 3B shows a horizontal arrangement of the lead-in area, the lead-out area, and the zone area 0–23 that were shown in FIG. 3A.

The lead-in area and lead-out area each have a DMA (Defect Management Area) inside. The DMA records: position information showing the positions of sectors found to include defects; and replacement position information showing the positions of the sectors replacing the defective sectors located in a replacement area.

Each zone area has a user area on the inside, and the replacement area and an unused area are provided at the boundary between zone areas. The user area is an area that can be used by the file system as a recording area. The replacement area is used to replace defective sectors when such defective sectors are found. The unused area is an area that is not used for recording data. Only about two tracks are assigned as the unused area, with such unused area being provided to prevent mistaken identification of sector addresses. This is because while sector addresses are recorded at a same position in adjacent tracks within the same zone, for Z-CLV the sector addresses are recorded at different positions in adjacent tracks at the zone boundary.

In this way, sectors which are not used for data recording exist at the boundaries between zone areas. Therefore, on a DVD-RAM, logical sector numbers (LSN: Logical Sector Number) are assigned to physical sectors of the user area in order starting from the inner periphery to consecutively show only the sectors used for recording data.

As shown in FIG. 3C, the area that records user data and is composed of sectors that have been assigned LSNs is called volume area.

Also, as shown in FIG. 3D, in the innermost and outermost peripheries of the volume area, volume structure information is recorded to be used to deal with the disc as a logical volume. The rest of the volume area except the areas for recording the volume structure information is called a partition area. The partition area records files. The logical block numbers (LBN: Logical Block Number) are assigned to sectors of the partition area in order starting from the first sector. Hereinafter, the logical block number is also called sector address.

FIG. 4 shows a hierarchical relation between zone areas, ECC blocks, and sectors. As shown in the drawing, each zone area includes a plurality of ECC blocks. It is desirable for recording apparatuses that in the optical discs, areas in units of sectors are assigned to non-AV data, while areas in units of consecutive recording areas are assigned to AV data so that each consecutive recording area secures uninterrupted reproduction of the AV data. Here, each consecutive recording area is composed of consecutive sectors in units of ECC blocks (in other words, each area is an integral multiple of an ECC block) and has a predetermined size (about 7 MB) or more, each consecutive recording area not outstepping the boundary between zones. However, when the AV data includes a plurality of extents, the last extent may be smaller than the predetermined size. The reason why it is defined that each consecutive recording area does not outstep the boundary between zones is that an outstepping of the boundary will change the rotation angular velocity of the optical disc, which will disturb the uninterrupted reproduction. The reason why each consecutive recording area is an integral multiple of an ECC block is that the ECC block is the minimum unit dealt with in the ECC process.

<1-2 AV File (VOB) and AV Data Management File>

Figure 5:
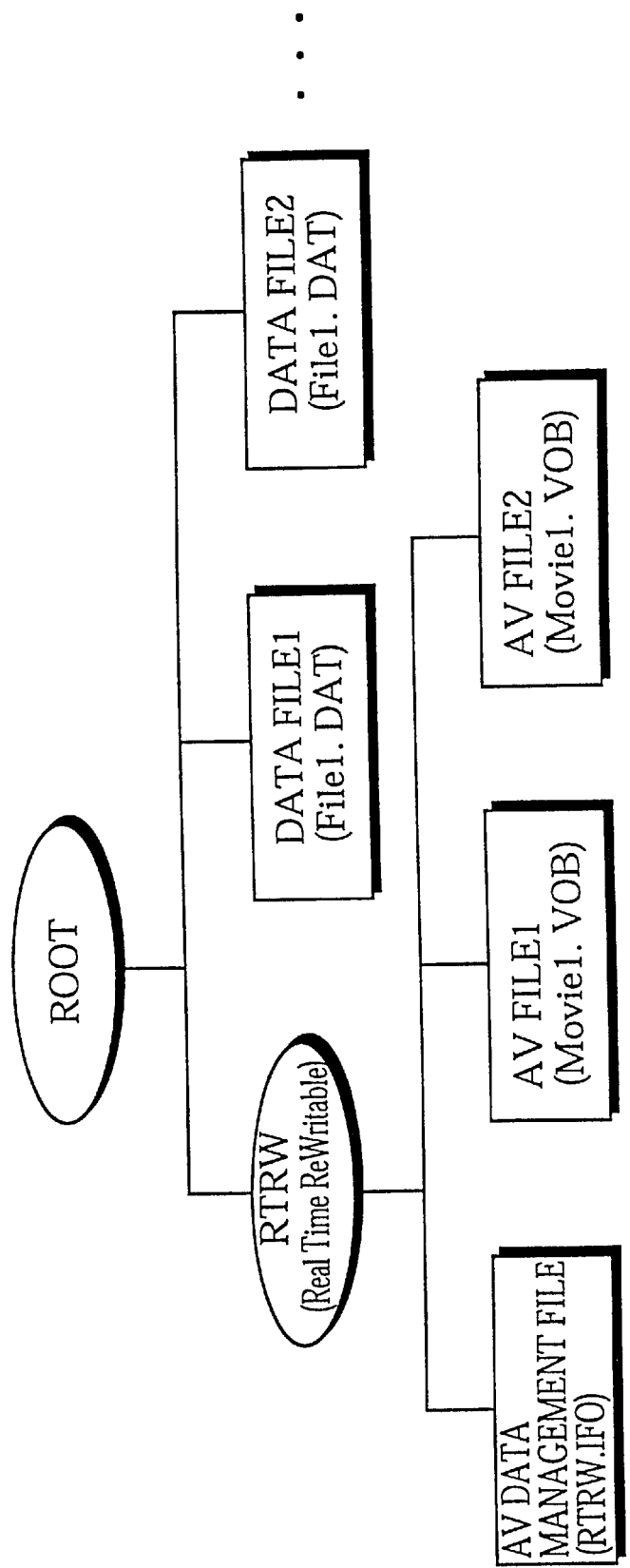
FIG. 5 shows directories and AV data and non-AV data recorded on a DVD-RAM disc.

FIG. 5 shows directories and AV data and non-AV data recorded on a DVD-RAM disc.

In the drawing, ellipses represent directories and rectangles represent files.

The directory "ROOT" includes a directory "RTRW" and two non-AV data files: "File1.DAT" and "File2.DAT." The directory "RTRW" includes an AV data management file "RTRW.IFO" and a plurality of AV data files: "Movie1.VOB," "Movie2.VOB," . . . Each AV file represents one VOB. The AV data management file is a file for recording information used for managing AV files recorded in the current directory ("RTRW") or on the optical disc.

<1-2-1 Data Structure of VOB>

Figure 6A:
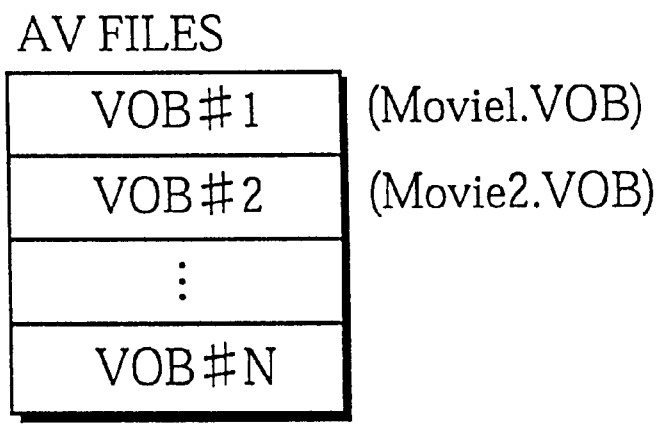
FIG. 6A shows VOBs which are recorded as AV data files "Movie1.VOB" and "Movie2.VOB"

As shown in FIG. 6A, the AV data files "Movie1.VOB," "Movie2.VOB," . . . are each recorded into the data area as one VOB.

FIG. 6B shows a structure of the VOB in which elementary streams (video streams and audio streams) are multiplexed.

As shown in the drawing, the VOB 70 includes video stream 72, audio stream 73, and audio stream 74. The audio stream 74 is used for dubbing. It is desirable that the audio stream 74, which is dedicated to dubbing, has the same bit rate as the audio stream 73. However, there will be no problem if the audio stream 74 includes an area in which audio data with the same time period as the audio stream 73 can be recorded, even if the audio stream 74 has a different bit rate from the audio stream 73.

The video stream 72 is a compressed data sequence with a variable-length bit rate, encoded in compliance with the MPEG2 standard. The video stream 72 includes a plurality of GOPs (Group Of Pictures) which each include a plurality of pictures. For example, as shown in the drawing, the video pictures 71 include compressed/encoded pictures which are any of I(Intra)-picture, P(Predictive)-picture, and B(Bidirectionally predictive)-picture defined in MPEG2 standard. Also, as indicated by GOP 71a in FIG. 6B, each GOP includes at least one I-picture and is a video data section corresponding to a reproduction time period of about 0.5 seconds. This indicates that independent reproduction in units of about 0.5 seconds is possible. It should be noted here that the video pictures 71 in the drawing are shown in the order of decoding, not in the order of display.

The audio stream (#0) 73 is audio data which should be reproduced simultaneously with the video stream. In the DVD-RAM, any of three types of modes: MPEG audio, AC-3, and linear PCM can be used for encoding audio streams. With the MPEG audio or AC-3, audio data is compressed; with the linear PCM, audio data is not compressed. The audio stream (#0) 73 is encoded with any of the three encoding modes.

The audio stream (#1) 74 is an audio stream for dubbing and has the same reproduction time period as the audio stream (#0) 73. It is presumed that the audio streams #0 and #1 shown in the drawing have the same encoding mode, the same bit rate, and the same audio data.

VOB 70 is composed of a plurality of Video OBject Units (VOBUs) arranged in the order of reproduction: VOBU 75a, VOBU 75b, VOBU 75c, . . . Each VOBU includes video data corresponding to one GOP. Each VOBU includes packs which respectively belong to the elementary streams. Each pack has a fixed length (2 KB) and includes data which is a part of an elementary stream.

The video packs (V_PCK 72a, V_PCK 72b, . . . ) each include data which is a part of the video stream 72.

The audio packs (A0_PCK 73a, A0_PCK 73b, . . . ) each include data which is a part of the audio stream 73.

The audio packs (A1_PCK 74a, A1_PCK 74b, ...) each include data which is a part of the audio stream 74. In the present embodiment, the audio stream #1 has the same encoding mode, the same bit rate, and the same audio data as the audio stream #0 when the audio stream #1 is first recorded onto the disc. Therefore, the audio streams #0 and #1 have the same number of packs.

The audio stream #1 is multiplexed as well as the audio stream #0 to secure an area in which audio data for dubbing can be recorded.

The above statement is explained more specifically. It is desirable that the audio stream (#1) 74 has the same bit rate and the same encoding mode as the audio stream #0. This is because, with the same bit rate and the same encoding mode, the optical disc recording apparatus can generate the audio streams #1 for dubbing without difficulty by copying the output of one audio encoder (the audio stream #0). This ensures that the audio stream #1 has the same audio quality as the audio stream #0.

Alternatively, the audio stream #1 may have a different bit rate from the audio stream #0. In this case, the same audio quality as the audio stream #0 may not be ensured for the audio stream #1. As a result, the optical disc recording apparatus may include two audio encoders so that the audio stream #1 may store the audio data which has the same source as that of the audio stream #0.

In any case, the audio stream #1 for dubbing needs to include an area in which audio data with the same time period as the audio stream #0 can be recorded. With this arrangement, it is possible to ensure facilitating dubbing into the audio stream #1 though the audio streams #0 and #1 may be different in the audio quality due to the difference in the bit rate or the encoding mode.

Furthermore, it is desirable that the audio streams #0 and #1 have the same audio data content whether they have the same or different encoding mode. The reason for this is as follows. DVD recorders or reproducing apparatuses have one audio decoder. This makes it impossible for such an apparatus to simultaneously reproduce the audio streams #0 and #1. As shown in FIG. 7, the decoder should be instructed to change the reproduction-target audio streams at the boundaries between the audio streams #0 and #1 (in both directions) when the audio stream #1 is partially dubbed. In general, it is difficult to accurately change the audio streams at the boundaries since a reproduction-target audio stream is specified by a host side, that is, under control of a microcomputer. Under such a condition, it is impossible to ensure uninterrupted reproduction. Accordingly, it is arranged that the audio stream #1 records the same audio data content as the audio stream #0. This eliminates the need for switching audio streams at the boundaries in partial dubbings, enabling uninterrupted reproduction at the boundaries.

Figure 8:
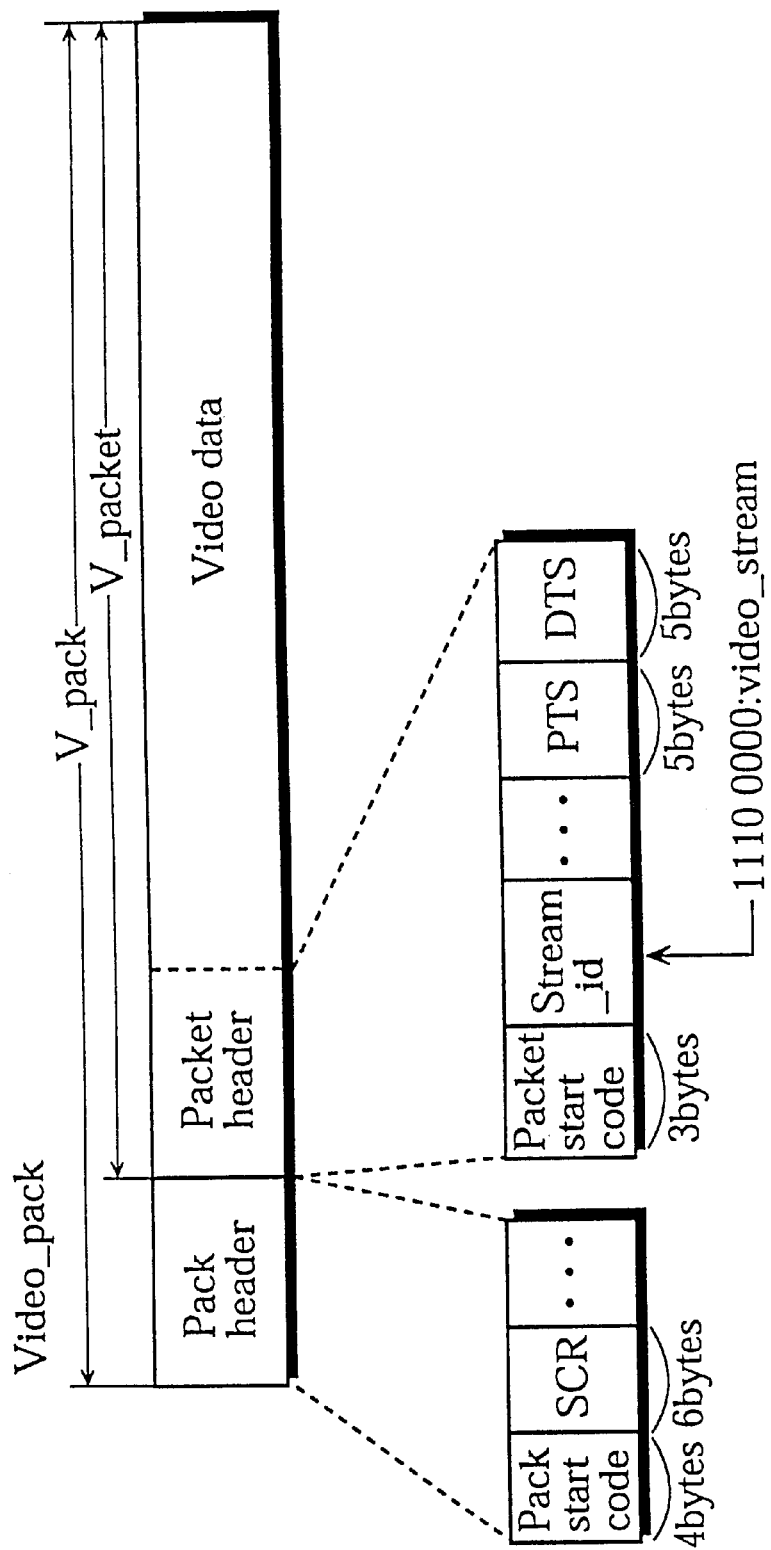
FIG. 8 shows a data format of the video pack.
Figure 9:
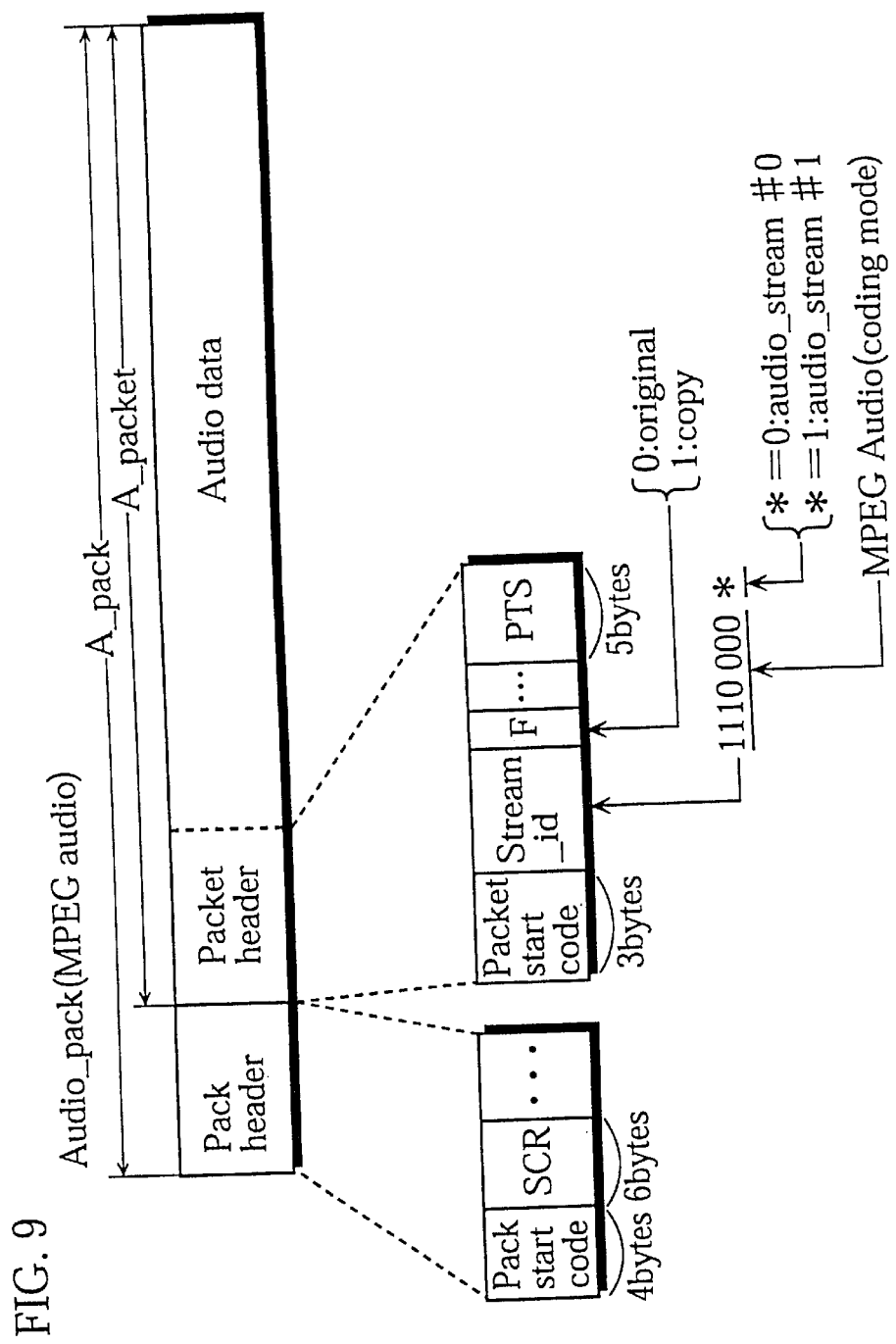
FIG. 9 shows a data format of the audio pack (MPEG audio)
Figure 10:
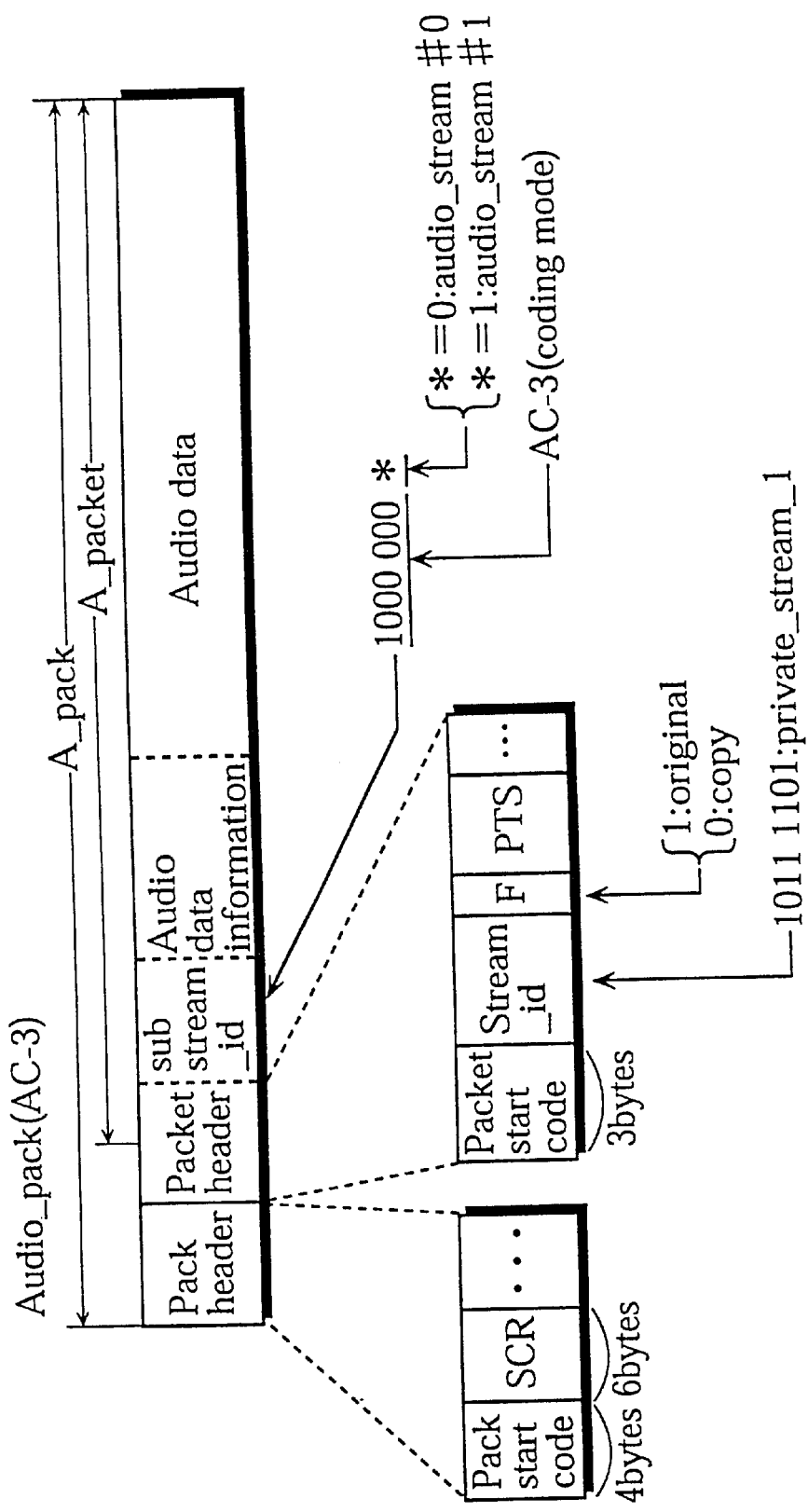
FIG. 10 shows a data format of the audio pack (AC-3)
Figure 11:
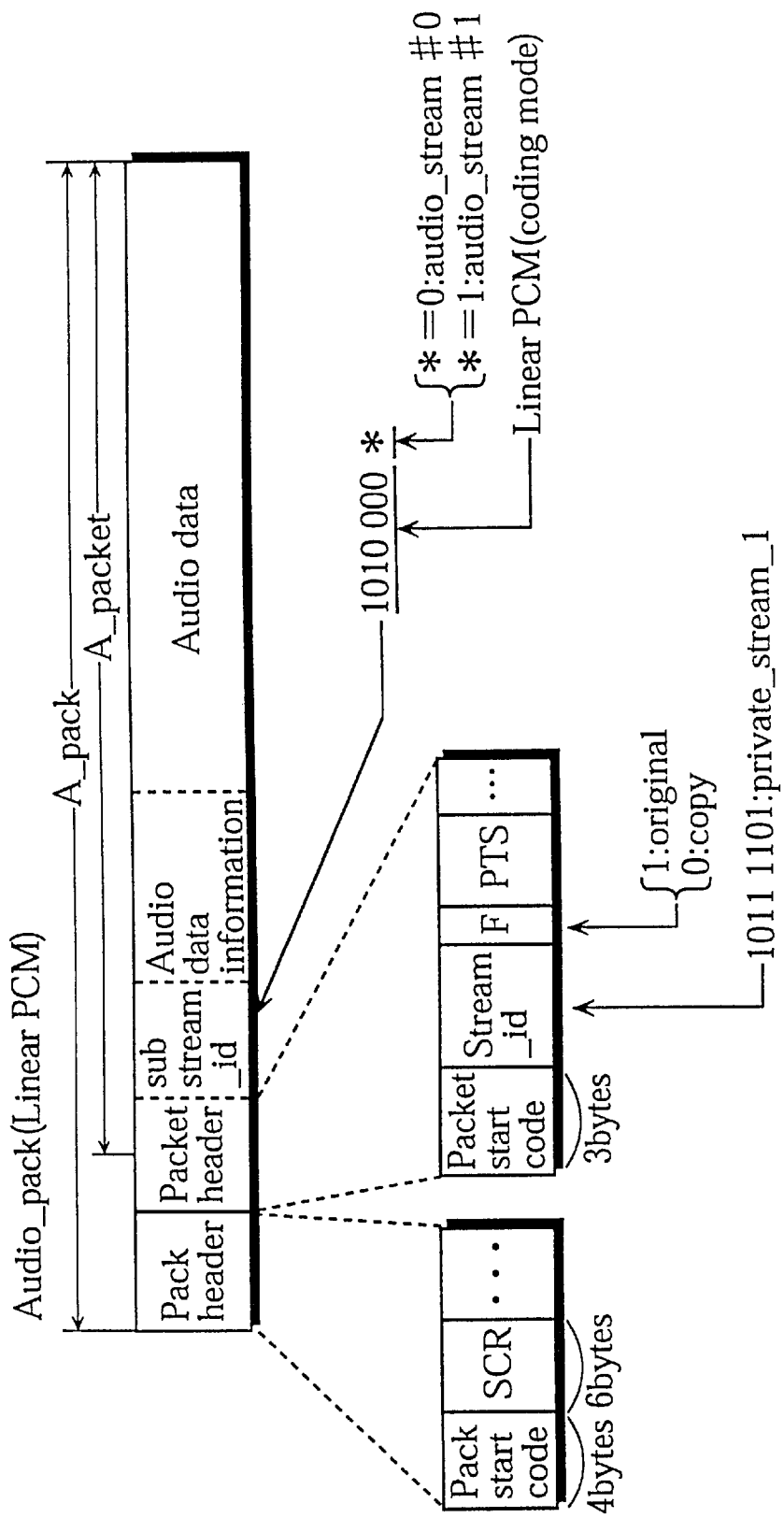
FIG. 11 shows a data format of the audio pack (linear PCM)

FIG. 8 shows a data format of the video pack. FIGS. 9–11 show data formats of audio packs.

In the DVD-RAM, each pack includes one packet. The pack is composed of a pack header and a packet. The pack has a fixed size of 2 KB, which is the same as the sector size in the DVD-RAM. The pack header includes a pack start code, a System Clock Reference (SCR), and other data. The SCR is a kind of a time stamp and indicates a time at which the current pack passes through a demultiplexor of the reproducing apparatus. Here, the packs read from the DVD-RAM by the reproducing apparatus are separated into video and audio packs by the demultiplexor. The video data or audio data of each pack is stored in the video buffer or audio buffer, and is decompressed (extended) by the video decoder or the audio decoder.

Each packet includes a packet header and a payload field. The packet header includes a packet start code, a stream ID, a DTS, a PTS, and other data.

The stream ID is an identifier indicating an elementary stream which includes the current pack.

The DTS (Decode Time Stamp) is a kind of time stamp and indicates a time at which video picture data or audio frame data is transferred from the video buffer or audio buffer to a video decoder or an audio decoder. The DTS is not attached to (omitted in) audio streams since audio streams are decoded and presented at the same time.

The PTS (Presentation Time Stamp) is a kind of a time stamp and indicates a time at which decoded video data or decoded audio data is displayed/output.

In the present embodiment, the stream ID of the video stream is "1110 0000" as shown in FIG. 8. The stream ID of the audio stream encoded with the MPEG audio is "1100 0000" (in case of the audio stream #0) or "1100 0001" (in case of the audio stream #1), as shown in FIG. 9. As shown in FIGS. 10 and 11, the stream ID of the audio streams encoded with the AC-3 or the linear PCM is "1011 1101" which is equivalent to the private stream 1 defined in the MPEG 2. Furthermore, either of the AC-3 and the linear PCM, and, either of the audio stream #0 and the audio stream #1 are identified by the sub-stream ID included in the packet payload.

The audio packs by the AC-3 or the linear PCM include a sub-stream ID following the packet header. As shown in FIG. 10, the sub-stream ID of the audio stream encoded with the AC-3 is "1000 0000" (in case of the audio stream #0) or "1000 0001" (in case of the audio stream #1). As shown in FIG. 11, the sub-stream ID of the audio stream encoded with the linear PCM is "1010 0000" (in case of the audio stream #0) or "1010 0001" (in case of the audio stream #1).

As described above, an elementary stream in which the current pack is included is identified by the stream ID and the sub-stream ID.

<1-2-2 AV Data Management File>

Figure 12:
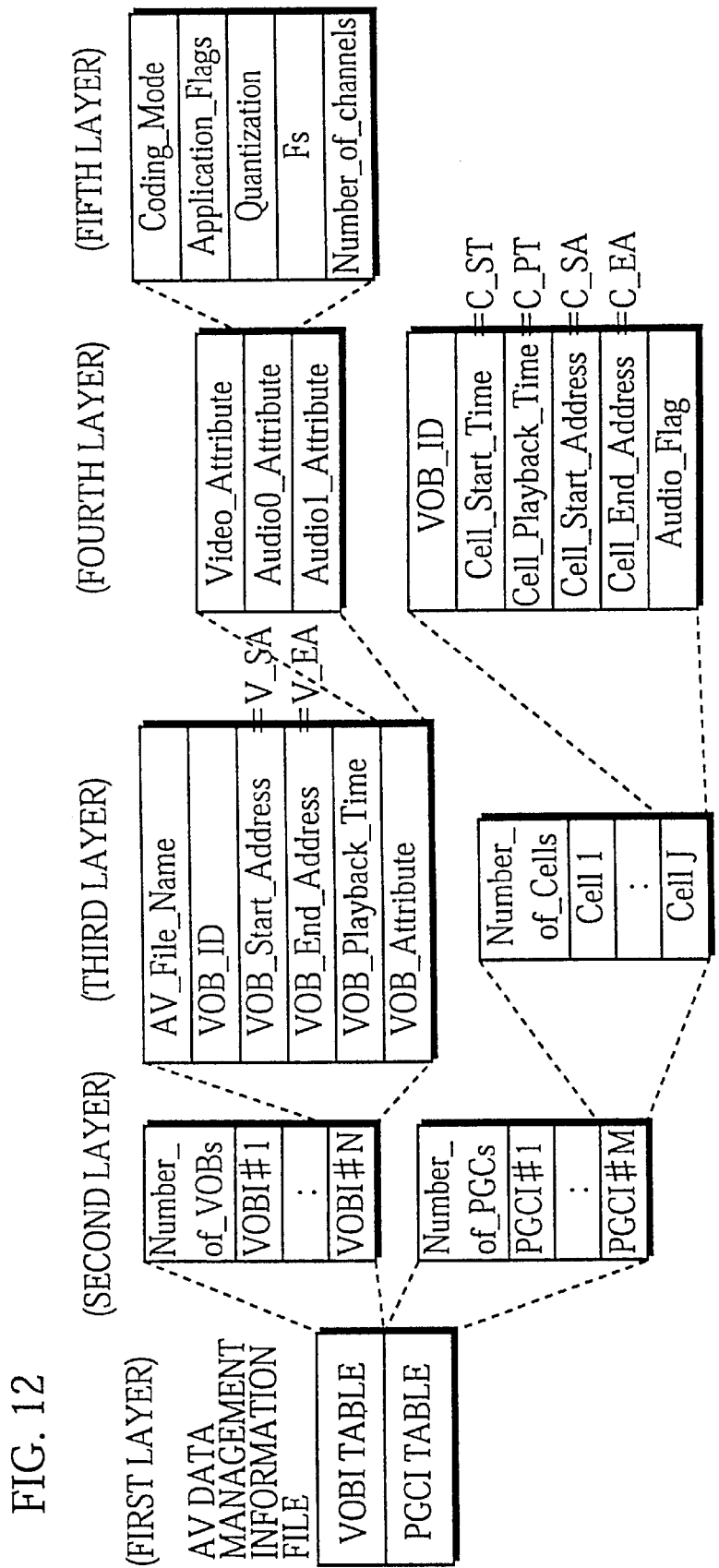
FIG. 12 hierarchically shows the data structure of the AV data management file.

FIG. 12 hierarchically shows the data structure of the AV data management file.

As shown in the first layer in the drawing, the AV data management file includes a VOB Information (VOBI) table and a PGC Information (PGCI) table.

<1-2-2-1 VOBI Table>

The VOBI table will be explained first.

As shown in the second layer in FIG. 12, the VOBI table includes information entitled "Number of VOBs," "VOBI#1," . . . "VOBI#N." The "Number of VOBS" indicates the number of VOBs recorded on the DVD-RAM disc (in the present example, the number is N). The "VOBI#1," . . . "VOBI#N" are information of respective VOBs recorded on the DVD-RAM disc.

As shown in the third layer in FIG. 12, each VOBI ("VOBI#1," . . . "VOBI#N") includes information entitled "AV File Name," "VOB ID," "VOB Start Address," "VOB End Address," "VOB Playback Time," and "VOB Attribute." The "VOB ID" is an identifier of the VOB. The "VOB Start Address" and "VOB End Address" are represented by sector addresses.

As shown in the fourth layer in FIG. 12, each "VOB Attribute" includes "Video Attribute," "Audio0 Attribute," and "Audio1 Attribute." The "Video Attribute" shows the resolution and aspect ratio (ratio of the vertical length to the horizontal length of the screen) of the video image in the video stream.

As shown in the fifth layer in FIG. 12, each of the "Audio0 Attribute" and "Audio1 Attribute" includes information entitled "Coding Mode," "Application Flag," "Quantization," "Fs," and "Number of Channels." The "Coding Mode" shows an encoding mode which is any of the MPEG audio, AC-3, and linear PCM. The "Application Flag" shows the contents of the audio stream. The "Quantization" includes information related to the quantization, such as a quantization coefficient. The "Fs" shows a sampling frequency. The "Number of Channels" indicates the number of channels included in the audio stream.

The "Application Flag" of the "Audio1 Attribute" has at least two bits. The value of the "Application Flag" indicates any of "same audio data," "nearly same audio data," "dubbing audio data," and "customized audio data."

The "same audio data" indicates that the audio data of the audio stream #1 is a copy of the audio data of the audio stream #0. That means the audio stream #1 and the audio stream #0 are the same in every respect, that is, in each of the encoding mode, in the bit rate, and in the audio data for each pack. That is, all the packs included in the audio stream #1 in one VOB correspond to the packs included in the audio stream #0 on a one-to-one basis. Also, each pack in the audio stream #1 has the same audio data as the audio data included in the corresponding pack in the audio stream #0.

The "nearly same audio data" indicates that the audio data of the audio stream #1 is not a copy of the audio data of the audio stream #0, but the source is the same.

The "dubbing audio data" indicates that the audio data of the audio stream #1 is a dubbing. In this case, the value of the "Application Flag" may indicate any of "same audio data," "nearly same audio data," and "customized audio data" before the dubbing is performed.

The "customized audio data" indicates that the audio data of the audio stream #1 is irrelevant to that of the audio stream #0. For example, the information indicates so when the audio data of the audio stream #1 is soundless data or audio data which is totally different from that of the audio stream #0.

It should be noted here that in the present embodiment, the values prepared for the "Application Flag" of the "Audio0 Attribute" are the same as those of the "Audio1 Attribute." However, the values of the "Application Flags" of the "Audio0 Attribute" and "Audio1 Attribute" may not necessarily be the same. The values may always be set to "customized audio data" or may be different.

<1-2-2-2 PGCI Table>

Now, the PGCI table will be explained.

As shown in the second layer shown in FIG. 12, the PGCI table includes information entitled "Number of PGCs," "PGCI#1," . . . "PGCI#M." The "Number of PGCS" indicates the number of PGCs recorded on the DVD-RA disc (in the present example, the number is M). Here, a "PGC" is a logically linked sequence of arbitrary sections in arbitrary VOBs containing AV data, or is a playback route of the logically linked sequence of AV data. Also, the "PGC information" is information indicating the logical linkage relation (playback route) between arbitrary sections in arbitrary VOBs. When a VOB is newly recorded, a PGCI of a PGC which is a simple sequence of sections in the VOB in the order is added to the PGCI table. The PGCI can be defined (edited) by the user as a logically linked sequence of arbitrary sections in arbitrary VOBs containing AV data, or is a, playback route of the logically linked sequence of AV data.

As shown in the third layer in FIG. 12, each PGCI ("PGCI#1," . . . "PGCI#M") includes information entitled "Number of Cells" and "Cell 1," . . . "Cell J." Here, one "cell" is an arbitrary section in an arbitrary VOB which can be specified by the user. Now, suppose the "Number of Cells" in the PGCI#M is J, then the "PGCI#M" indicates a logical sequence of sections containing AV data shown by "Cell 1," . . . "Cell J."

As shown in the fourth layer in FIG. 12, each of the "Cell 1," . . . "Cell J" includes information entitled "VOB ID," "Cell Start Time," "Cell Playback Time," "Cell Start Address," "Cell End Address," and "Audio Flag."

Figure 13:
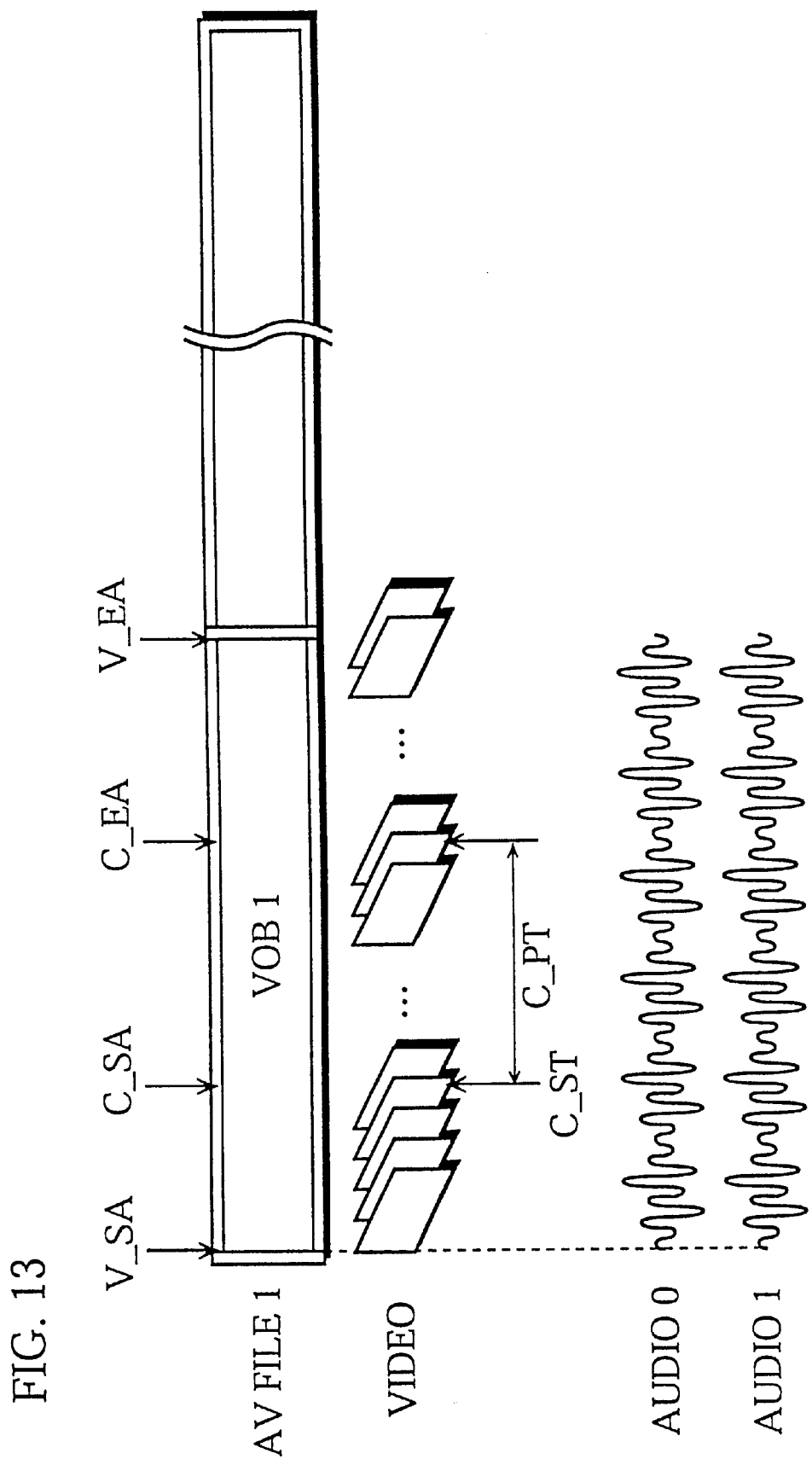
FIG. 13 shows relation between "Cell Start Time," "Cell Playback Time," "Cell Start Address," "Cell End Address," "VOB Start Address," "VOB End Address," and VOBs.

The pair of the "Cell Start Time" C_ST) and "Cell Playback Time" C_PT) specifies a section (a cell) in the VOB specified by the "VOB ID." As shown in FIG. 13, the "Cell Start Time" C_ST) indicates the start of the section using a PTS in the VOB. The end of the section is obtained by adding the C_PT to the C_ST.

The pair of the "Cell Start Address" and "Cell End Address" specifies a section (a cell) in the VOB specified by the "VOB ID." As shown in FIG. 13, the "Cell Start Address" C_SA) and "Cell End Address" C_EA) are within a range of the "VOB Start Address" (V_SA) to the "VOB End Address" (V_EA). When a VOB is newly recorded, a PGCI of a PGC which is a cell including all sections of the VOB is added to the PGCI table.

The "Audio Flag" specifies an audio stream that should be reproduced when the cell is reproduced. That is, the "Audio Flag" indicates the audio stream #0 when the flag has value "0," and indicates the audio stream #1 when it has value "1."

In the present embodiment, a cell is a section in a VOB specified by both a pair of a C_ST and a C_PT and a pair of a C_SA and a C_EA, as shown in FIG. 13. However, a cell may be a section in a VOB specified by either of the pair of a C_ST and a C_PT and the pair of a C_SA and a C_EA.

<1-2-2-3 Application Flag>

Figure 14:
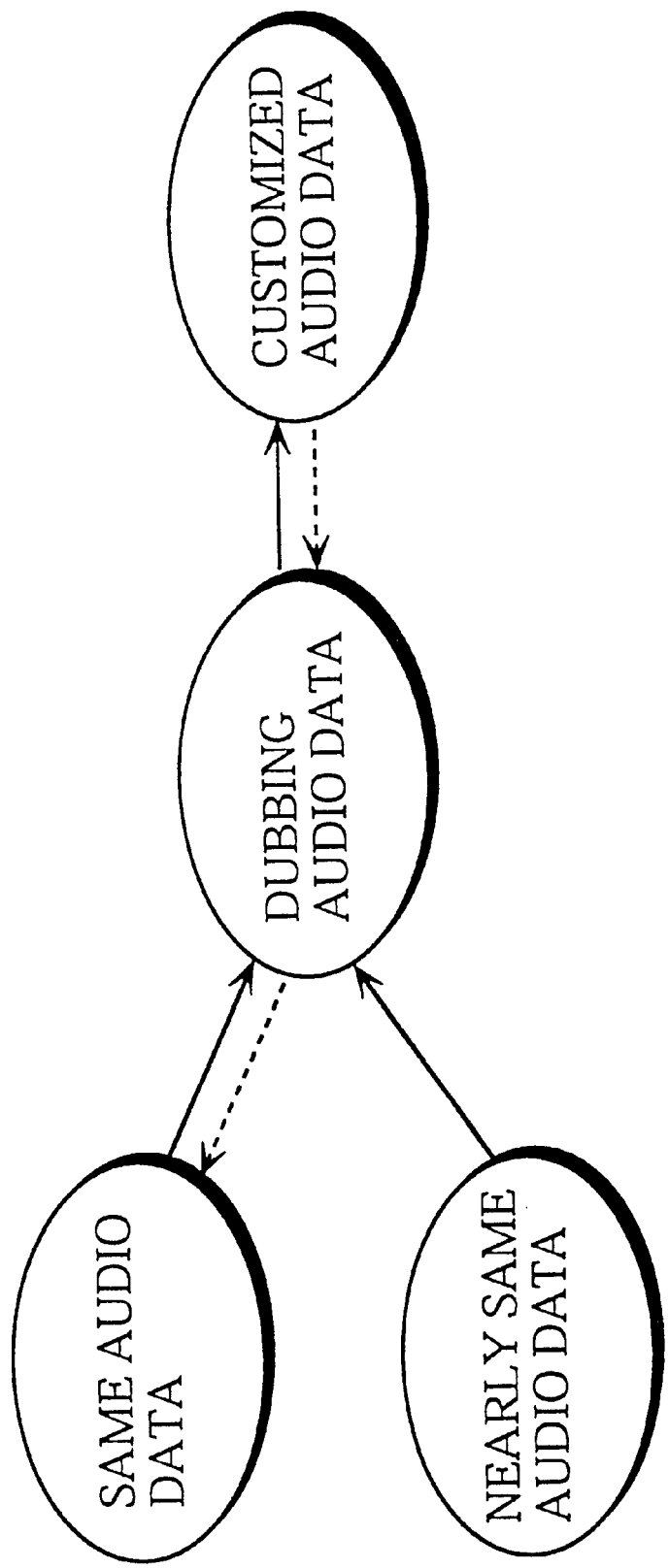
FIG. 14 shows a relationship between several pieces of information indicated by respective values of the "Application Flag" of the "Audio1 Attribute" in a VOBI.

FIG. 14 shows a relationship among several pieces of information indicated by respective values of the "Application Flag" of the "Audio1 Attribute" in a VOBI shown in FIG. 12.

As shown in the solid lines in the drawing, a partial or a whole dubbing can be performed on the audio stream #1 when the "Application Flag" is "same audio data" or "nearly same audio data." After the dubbing is complete, the "Application Flag" changes to a value indicating "dubbing audio data." It is possible to regard "dubbing audio data" as "customized audio data."

As shown in the dotted lines in FIG. 14, when the original application flag of the audio stream #1 is "same audio data," that is, the audio data of the audio stream #0 is copied to the audio stream #1 when the audio stream #1 is first recorded onto the disc, the audio data of the audio stream #0 can be copied to the audio stream #1 even after the dubbing is performed on the audio stream #1. After this is done, the application flag of the audio stream #1 indicates "same audio data" again.

It is possible to perform a whole dubbing on the audio stream #1 even if the application flag indicates "customized audio data." After the dubbing is performed, the application flag indicates "dubbing audio data."

<2 Optical Disc Recording/Reproducing Apparatus>

The optical disc recording/reproducing apparatus in the present embodiment is described below with reference to the drawings.

<2-1 System Using Optical Disc Recording/Reproducing Apparatus>

Figure 15:
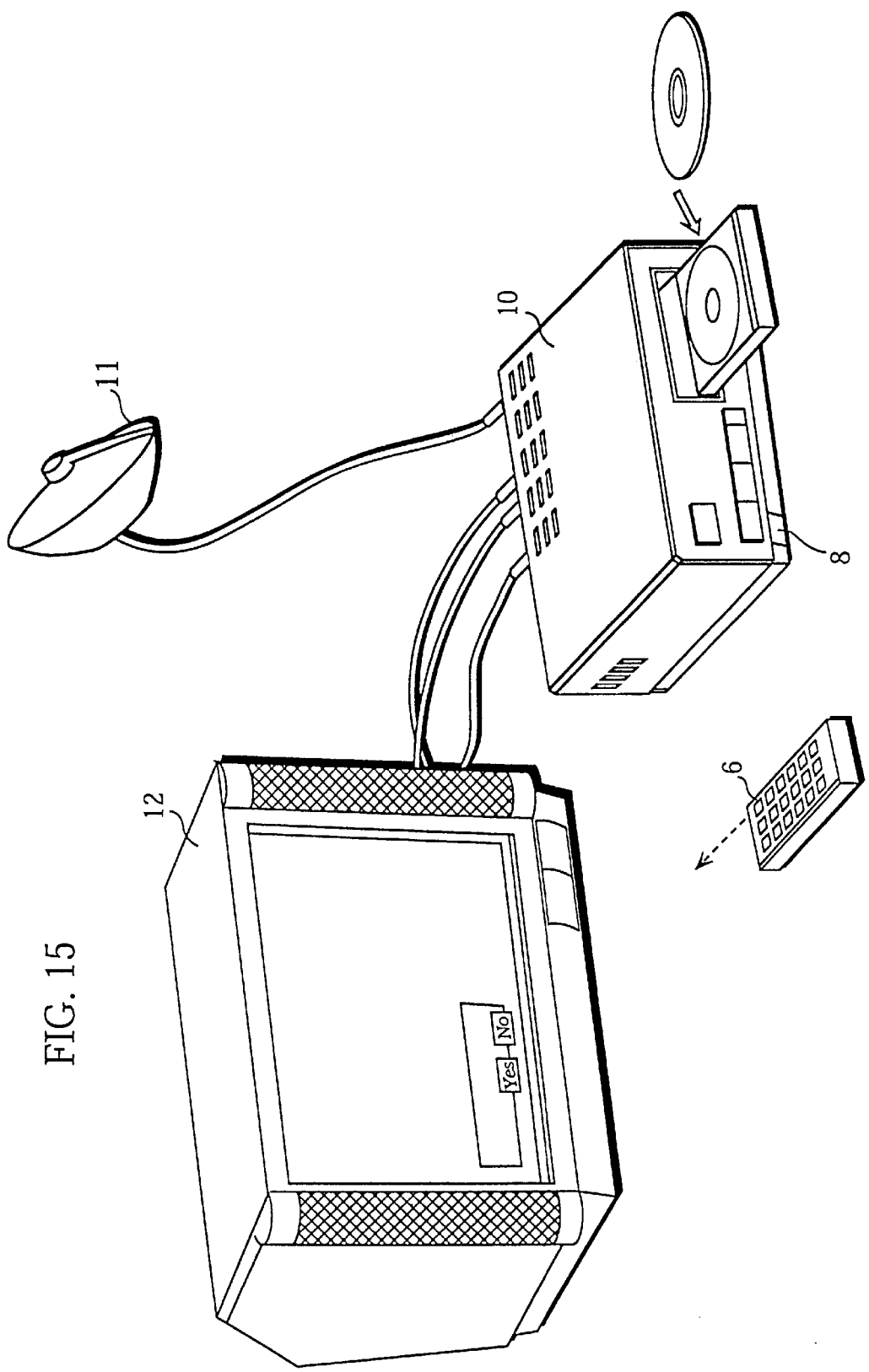
FIG. 15 shows the construction of an example system using the optical disc recording/reproducing apparatus of the present embodiment.

FIG. 15 shows the construction of an example system using the optical disc recording/reproducing apparatus of the present embodiment.

The system includes an optical disc recording/reproducing apparatus 10 (hereinafter DVD recorder 10), a remote controller 6 for operating the DVD recorder 10, an antenna 11, and a display 12, where the antenna 11 and display 12 are connected to the DVD recorder 10.

After the DVD-RAM disc, which is an optical disc and has been described earlier, is loaded, the DVD recorder 10 compresses the video/audio data which is included in the analog broadcasting waves which is received through the antenna 11, records the compressed data as AV files into the DVD-RAM disc, expands the compressed video/audio data, and outputs the expanded video/audio signals onto the display 12.

<2-2 Construction of DVD Recorder 10>

Figure 16:
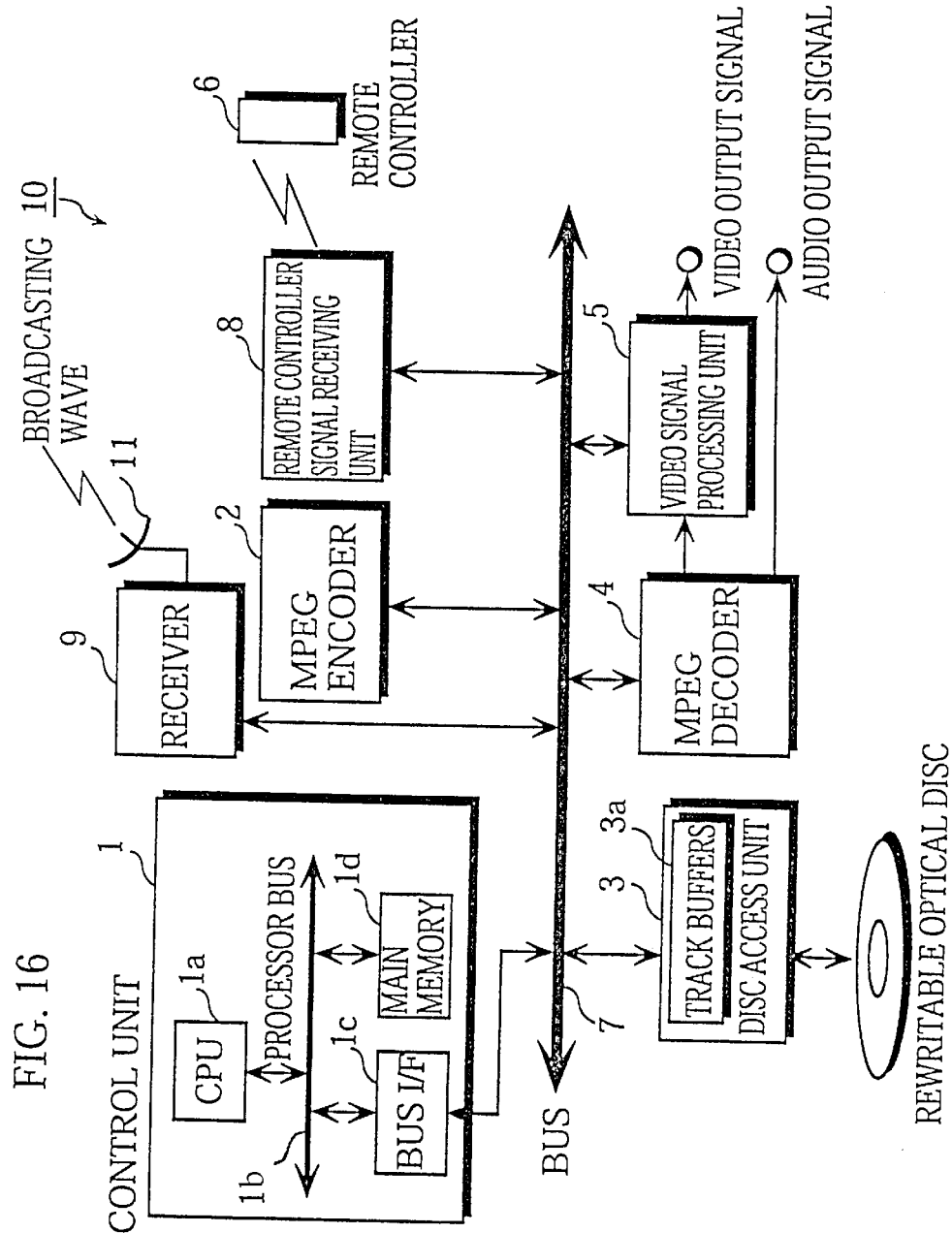
FIG. 16 is a block diagram showing the construction of the DVD recorder 10.

FIG. 16 is a block diagram showing the construction of the DVD recorder 10. The DVD recorder 10 includes a control unit 1, an MPEG encoder 2, a disc access unit 3, an MPEG decoder 4, a video signal processing unit 5, a remote controller 6, a bus 7, a remote controller signal receiving unit 8, and a receiver 9.

The control unit 1 includes a CPU 1a, a processor bus 1b, a bus interface 1c, and a main memory 1d. The control unit 1 executes a program stored in the main memory 1d to control the entire DVD recorder 10 in terms of recording, reproducing, editing, etc. Especially, after an AV file (VOB) including AV data is recorded, the control unit 1 generates VOB information and PGC information corresponding to the recorded VOB, and records or updates the AV data management file. Also, when the AV data is reproduced, the control unit 1 controls the reproduction of the section specified by information "Cell" included in the PGC information in the AV data management file shown in FIG. 12.

The MPEG encoder 2 compresses the video/audio data which is included in the analog broadcasting waves received by the receiver 9 through the antenna 11 and generates MPEG streams.

The disc access unit 3, having track buffers 3a, performs the following under the control of the control unit 1: records the MPEG stream received from the MPEG encoder 2 into the DVD-RAM disc via one track buffer 3a, reads out the MPEG stream from the DVD-RAM disc, and outputs the read MPEG stream to the MPEG decoder 4 via one track buffer 3a. During the dubbing process, the disc access unit 3 performs the recording and reproducing in parallel using a plurality of track buffers 3a.

The MPEG decoder 4 expands the compressed MPEG stream which is read out by the disc access unit 3, and outputs the expanded video data and audio signals.

The video signal processing unit 5 converts the video data output from the MPEG decoder 4 into video signals for the display 12.

Figure 17:
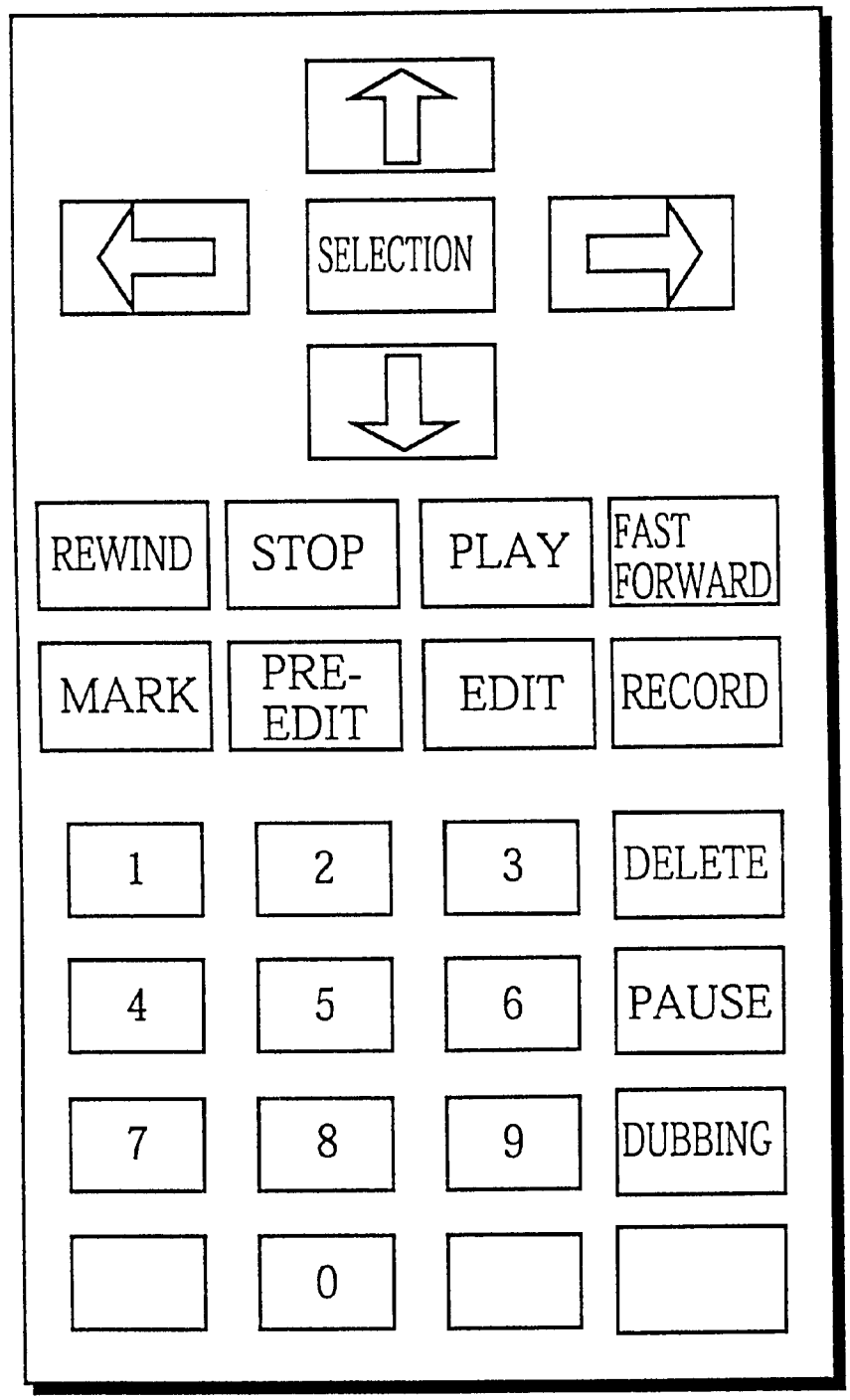
FIG. 17 shows a remote controller.

The remote controller signal receiving unit 8 receives remote controller signals from the remote controller 6 shown in FIG. 17 and informs the control unit 1 of which operation the user has instructed.

The DVD recorder 10 is, as shown in FIG. 15, constructed based on the premise that it is used as a replacement for a VTR used at home. Not limited to the construction, when the DVD-RAM disc is to be used as a recording medium for computers, the following constructions are possible. That is to say, the disc access unit 3 is connected, as a DVD-RAM drive apparatus, to a computer bus via an IF called SCSI or IDE. Also, the components other than the disc access unit 3 shown in FIG. 3 are achieved or operated when the OS and the application program are executed on the computer hardware.

Also, the DVD recorder 10 may be achieved as a camcorder (a recorder comprising a camera). In this case, the DVD recorder 10 includes a camera and a microphone instead of the receiver 9.

<2-2-1 MPEG Decoder 4>

Figure 18:
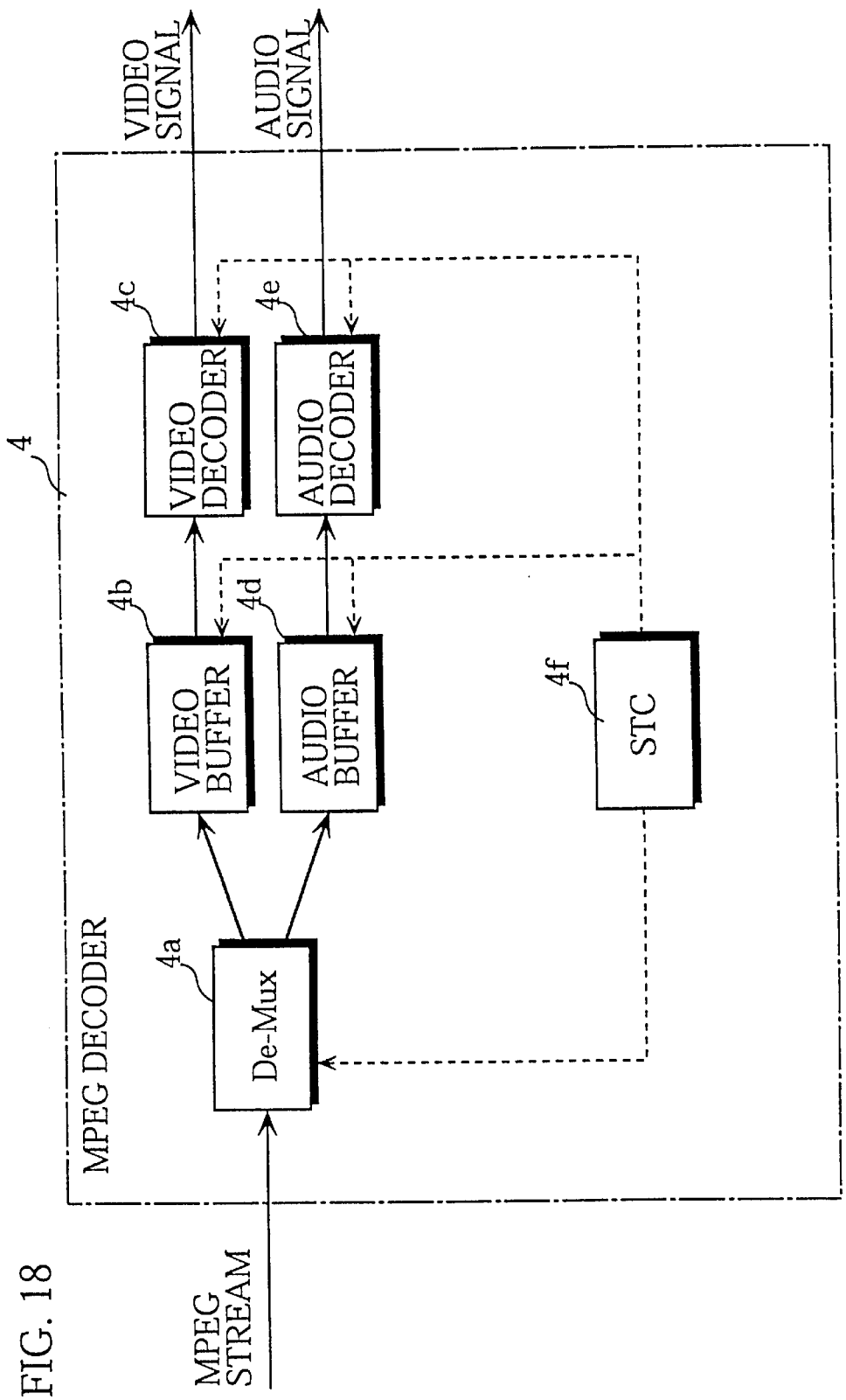
FIG. 18 is a block diagram showing the construction of the MPEG decoder 4 shown in FIG. 16.

FIG. 18 is a block diagram showing the construction of the MPEG decoder 4 shown in FIG. 16. As shown in FIG. 18, the MPEG decoder 4 includes a demultiplexor 4a for dividing MPEG streams into video streams and audio streams, a video buffer 4b for temporarily storing the divided video streams, a video decoder 4c for decoding the video streams stored in the video buffer 4b, a n audio buffer 4d for temporarily storing the divided audio streams, an audio decoder 4e for decoding the audio streams stored in the audio buffer 4d, and an STC (System Time Clock) unit 4f for generating an STC which shows a reference time used in the MPEG decoder 4.

The demultiplexor 4a divides an MPEG stream into a video stream and an audio stream. The demultiplexor 4a outputs the divided video stream to the video buffer 4b, and the divided audio stream to the audio buffer 4d. In doing so, the demultiplexor 4a selects either of the audio stream #0 and the audio stream #1 as the divided audio stream in accordance with a specification by the control unit 1 of an audio stream to be reproduced. The other one of the audio streams, not specified by the control unit 1, is discarded.

The above process will be described more specifically. The demultiplexor 4a analyzes the pack header and the packet header of each pack included in the input MPEG stream. The demultiplexor 4a then refers to the stream ID and the sub-stream ID to identify the stream of each pack which is any of the video stream, the audio stream #0, or the audio stream #1 for dubbing.

The demultiplexor 4a discards packs when it finds the packs belong to an audio stream which is not specified by the control unit 1 as an audio stream to be reproduced.

When finding a pack which belongs to an audio stream specified by the control unit 1, the demultiplexor 4a outputs the audio data stored in the payload field of the packet of the pack to the audio buffer 4e with the timing when the STC matches the SCR of the pack. At the same time, the demultiplexor 4a outputs the PTS attached to the packet to the audio decoder 4e.

When finding a pack which belongs to the video stream, the demultiplexor 4a outputs the video data stored in the payload field of the packet of the pack to the video buffer 4b with the timing when the STC matches the SCR of the pack. At the same time, the demultiplexor 4a outputs the DTS and PTS assigned to the packet to the video decoder.

The data stored in the payload field of each pack is input to the video buffer 4b or the audio buffer 4d at the time indicated by the SCR. The data stored in the video buffer 4b or the audio buffer 4d is fetched from the buffer at the time indicated by the DTS.

<2-2-2 MPEG Encoder 2>

Figure 19:
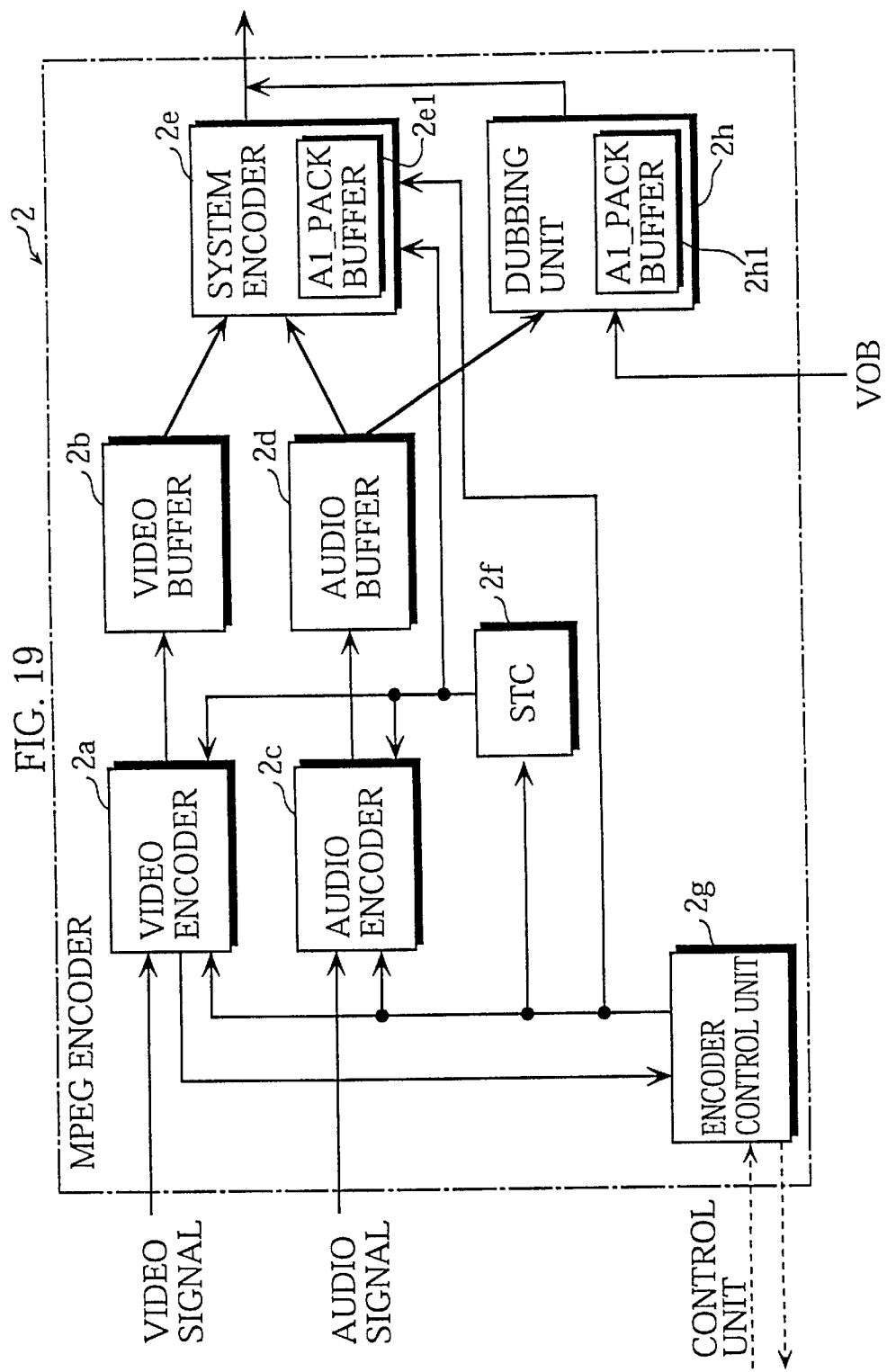
FIG. 19 is a block diagram showing the construction of the MPEG encoder 2 shown in FIG. 16.

FIG. 19 is a block diagram showing the construction of the MPEG encoder 2 shown in FIG. 16. As shown in FIG. 19, the MPEG encoder 2 includes a video encoder 2a, a video buffer 2b, an audio encoder 2c, an audio buffer 2d, a system encoder 2e, an STC (System Time Clock) unit 2f, an encoder control unit 2g, and a dubbing unit 2h.

The video encoder 2a compresses the video signals received via the receiver 9 and generates a video stream.

The video buffer 2b temporarily stores the video stream output from the video encoder 2a.

The audio encoder 2c compresses the audio signals received via the receiver 9 and generates an audio stream, during the recording process. The audio encoder 2c compresses another audio source to generate an audio stream, during the dubbing process. The other audio source is, for example, an audio signal input through a microphone, or an audio signal which is a mixture of an audio signal input through a microphone and a decoded audio stream #0.

The audio buffer 2d temporarily stores the audio stream output from the audio encoder.

The system encoder 2e, including an A1_pack buffer 2e1:
(a) generates packs of the video stream and the audio stream #0,
(b) generates audio packs of the audio stream #1 for dubbing, and
(c) performs multiplexing.

In the above (a) process, the system encoder 2e fetches the video stream and the audio stream #0 respectively from the video buffer 2b and the audio buffer 2d and sequentially generates video packs (V_PACKs) and audio packs (A0_PACKs). In the above (b) process, the system encoder 2e generates audio packs (A1_PACKs) of the audio stream #1. In this process, the system encoder 2e generates A1_PACKs by copying the A0_PACKs of the audio stream #0 into the A1_pack buffer 2e1, and rewriting a part of the pack header and the packet header. In the multiplexing in the above (c) process, the system encoder 2e sequentially outputs the V_PACK, A0_PACK, and A1_PACK one by one in the order indicated by the SCR. By repeating this, the system encoder 2e outputs these packs as VOBs to the disc access unit 3.

Figure 25:
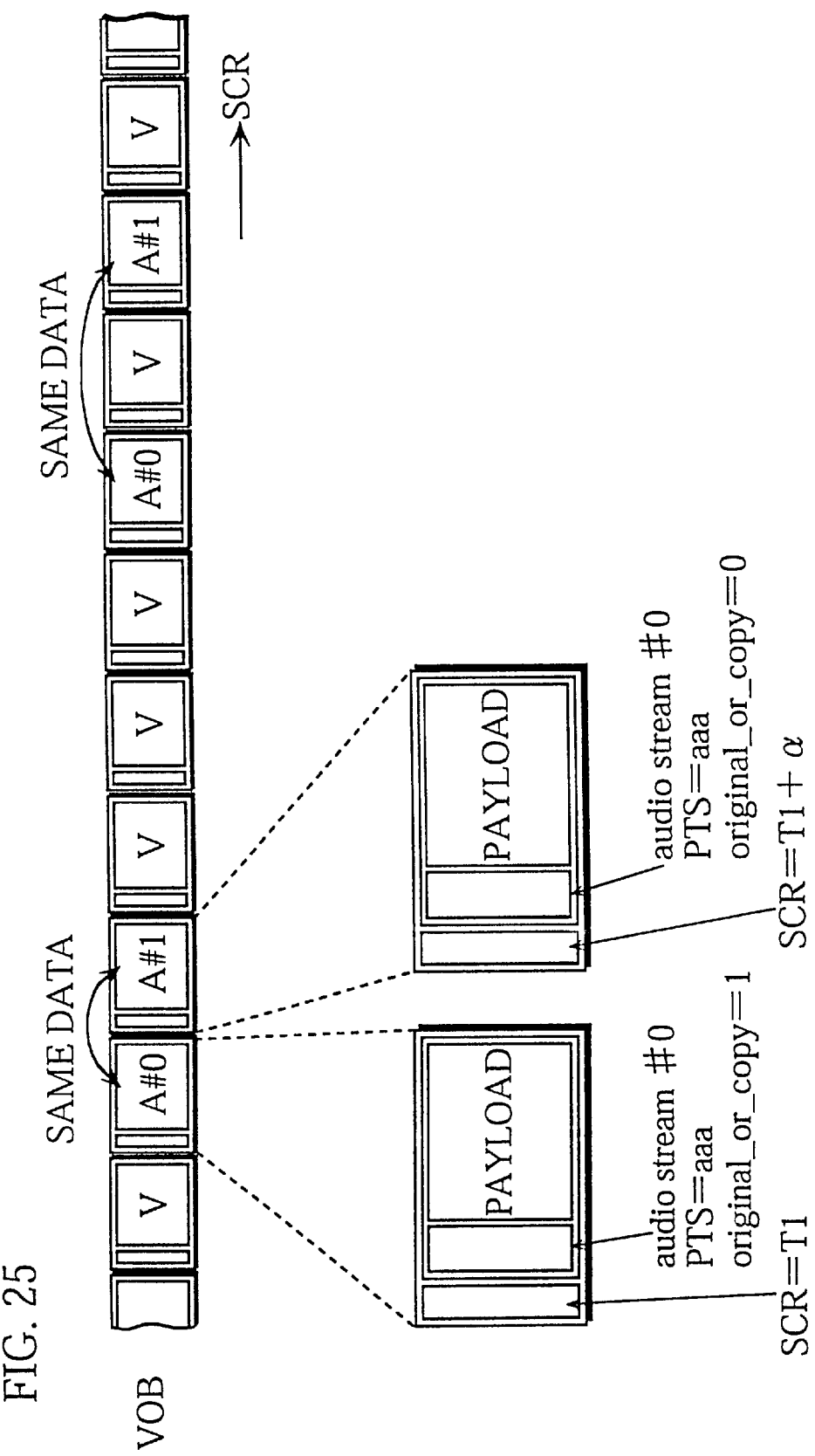
FIG. 25 shows the VOBs output from the system encoder 2e.

FIG. 25 shows the VOBs output from the system encoder 2e. In the drawing, "V" represents a video pack (V_PACK), "A#0" an audio pack of the audio stream #0 (A0_PACK), "A#1" an audio pack of the audio stream #1 (A1_PACK). Each pair of the A1_PACK and the A0_PACK corresponding to each other has the same audio data, but has different stream IDs (or sub-stream IDs) and different SCRs. The SCR of the A1_PACK of a pair is equal to the SCR of the A0_PACK of the pair plus a predetermined value α, so that they are multiplexed to be located at adjacent or near places in the VOB.

The STC unit 2f generates an STC which shows a reference time used in the encoder 2.

Figure 20:
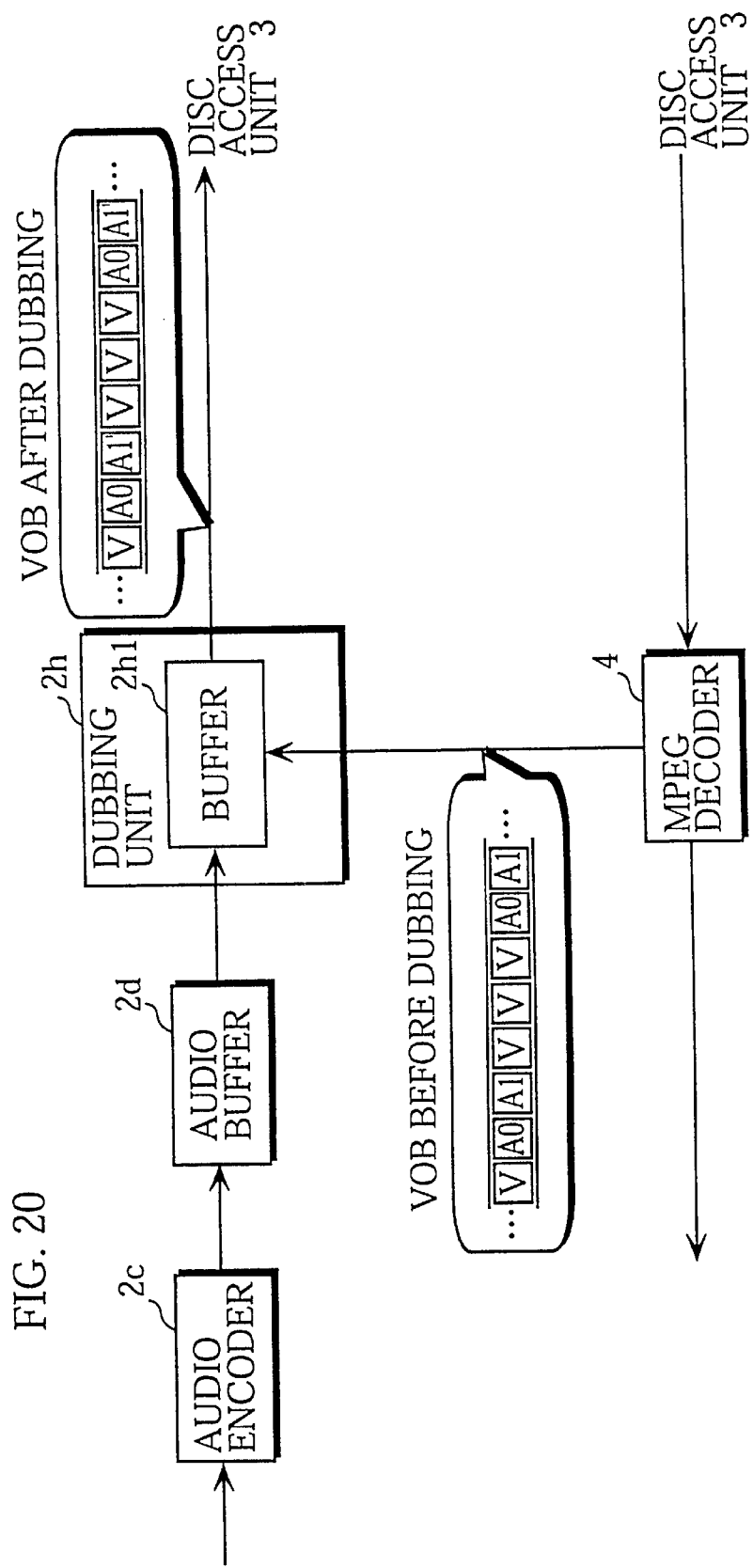
FIG. 20 shows the operation executed during the dubbing process.

The dubbing unit 2h, after a VOB read from the DVD-RAM disc is input from the disc access unit 3 during the dubbing process, replaces the audio data stored in the payload field of the A1_PACKs in the VOB with new audio data fetched from the audio buffer 2d, then outputs the VOB to the disc access unit 3 as a VOB after dubbing. FIG. 20 shows the operation executed during the dubbing process. The drawing shows that the VOB is the same before and after the dubbing except that the A1_PACKs change to A1'_PACKs. That is, while the VOB read from the DVD-RAM disc is reproduced by the MPEG decoder 4, the dubbing unit 2h sequentially stores the packs of the VOB before dubbing into the buffer 2h1 then replaces the audio data of only the A1_PACKs among the stored packs with other data.

The disc access unit 3, having track buffers 3a, performs the following under the control of the control unit 1: records the MPEG stream received from the MPEG encoder 2 into the DVD-RAM disc via one track buffer 3a, reads out the MPEG stream from the DVD-RAM disc, and outputs the read MPEG stream to the MPEG decoder 4 via one track buffer 3a. During the dubbing process, the disc access unit 3 performs the recording and reproducing in parallel using a plurality of track buffers 3a.

<2-2-3 Disc Access Unit 3>

Figure 21:
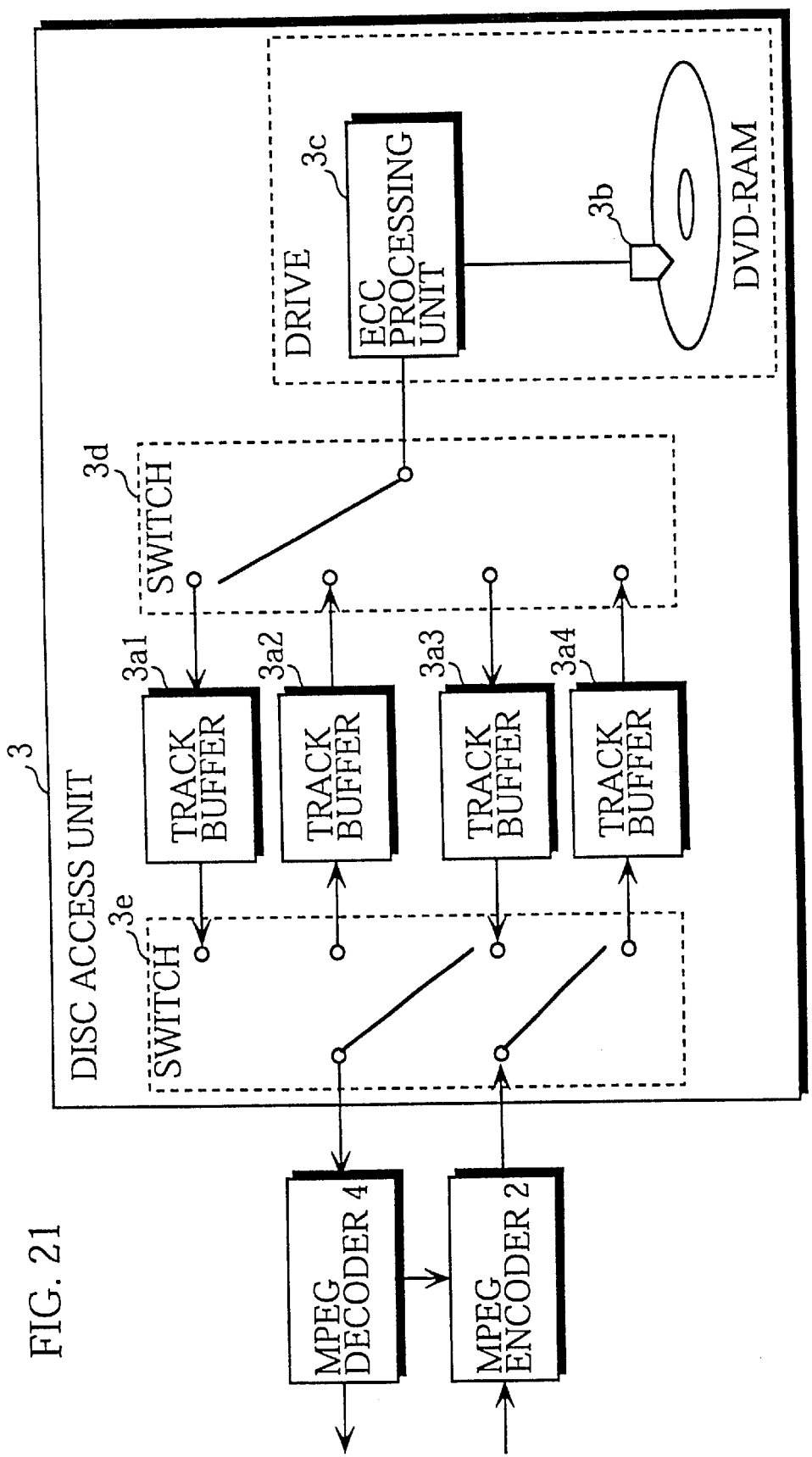
FIG. 21 shows the construction of the disc access unit 3.

FIG. 21 shows the construction of the disc access unit 3 shown in FIG. 16. The disc access unit 3 includes track buffers 3a1 to 3a4, an optical pickup 3b, an ECC (Error Correcting Code) processing unit 3c, and switches 3d and 3e.

The track buffers 3a1 and 3a3 are used for reading data from the disc and the track buffers 3a2 and 3a4 are used for writing onto the disc.

The ECC processing unit 3c performs the ECC process on the data read through the optical pickup 3b in units of 16 sectors (in an ECC block unit) when data on the disc is reproduced. The ECC processing unit 3c performs the ECC process on the data input though the switch 3d in an ECC block unit when data is written onto the disc.

The switch 3d connects the ECC processing unit 3c to the track buffer 3a1 or 3a3 so that the read data is stored in the buffer when data on the disc is reproduced, connects the ECC processing unit 3c to the track buffer 3a2 or 3a4 when data is written onto the disc, and connects the ECC processing unit 3c to any of the track buffers 3a1 to 3a4 in sequence so that the reproducing and writing are performed in real time when the dubbing process is executed.

The switch 3e connects the track buffer 3a1 or 3a3 to the MPEG decoder 4 when data on the disc is reproduced, connects the track buffer 3a2 or 3a4 to the MPEG encoder 2 when data is written onto the disc. When the dubbing process is executed, the switch 3e connects alternately the track buffer 3a1 and 3a3 to the MPEG decoder 4 and connects alternately the track buffer 3a2 and 3a4 to the MPEG encoder 2.

Since the switches 3d and 3e operate as described above, the reading from the optical disc or the writing onto the disc can be performed in parallel with the rewriting of the audio stream #1 performed by the MPEG encoder 2. For example, the reading of data from the optical disc and the storing of the read data into the track buffer 3a3 can be performed in parallel with the updating of the audio stream #1 stored in the track buffer 3a1 and the storing of the updated audio stream into the track buffer 3a2. This makes it possible to perform the dubbing in real time while the disc is reproduced.

<2-3 Writing>

When the user presses the RECORD key on the remote controller 6, the control unit 1 is notified of it via the remote controller signal receiving unit 8 and the bus 7 shown in FIG. 16.

After receiving the above notification, the control unit 1 instructs the MPEG encoder 2 to compress the video/audio signal included in the analog broadcasting wave the receiver 9 has received. The control unit 1 then instructs the disc access unit 3 to write the VOBs obtained by the compression onto the optical disc.

With the above control, the MPEG encoder 2 shown in FIG. 19 outputs the video stream compressed by the video encoder 2a to the video buffer 2b and outputs the audio stream #0 compressed by the audio encoder 2c to the audio buffer 2d, in sequence.

The system encoder 2e generates the audio stream #1 while fetching the video stream and the audio stream #0 respectively from the video buffer 2b and the audio buffer 2d, and multiplexes the three streams into VOBs and outputs the VOBs to the disc access unit 3 via the bus 7.

More specifically, the system encoder 2e: (a) generates packs of the video stream and the audio stream #0, (b) generates audio packs of the audio stream #1, and (c) performs multiplexing, as described earlier.

<2-3-1 Generating Video Packs>

Figure 22:
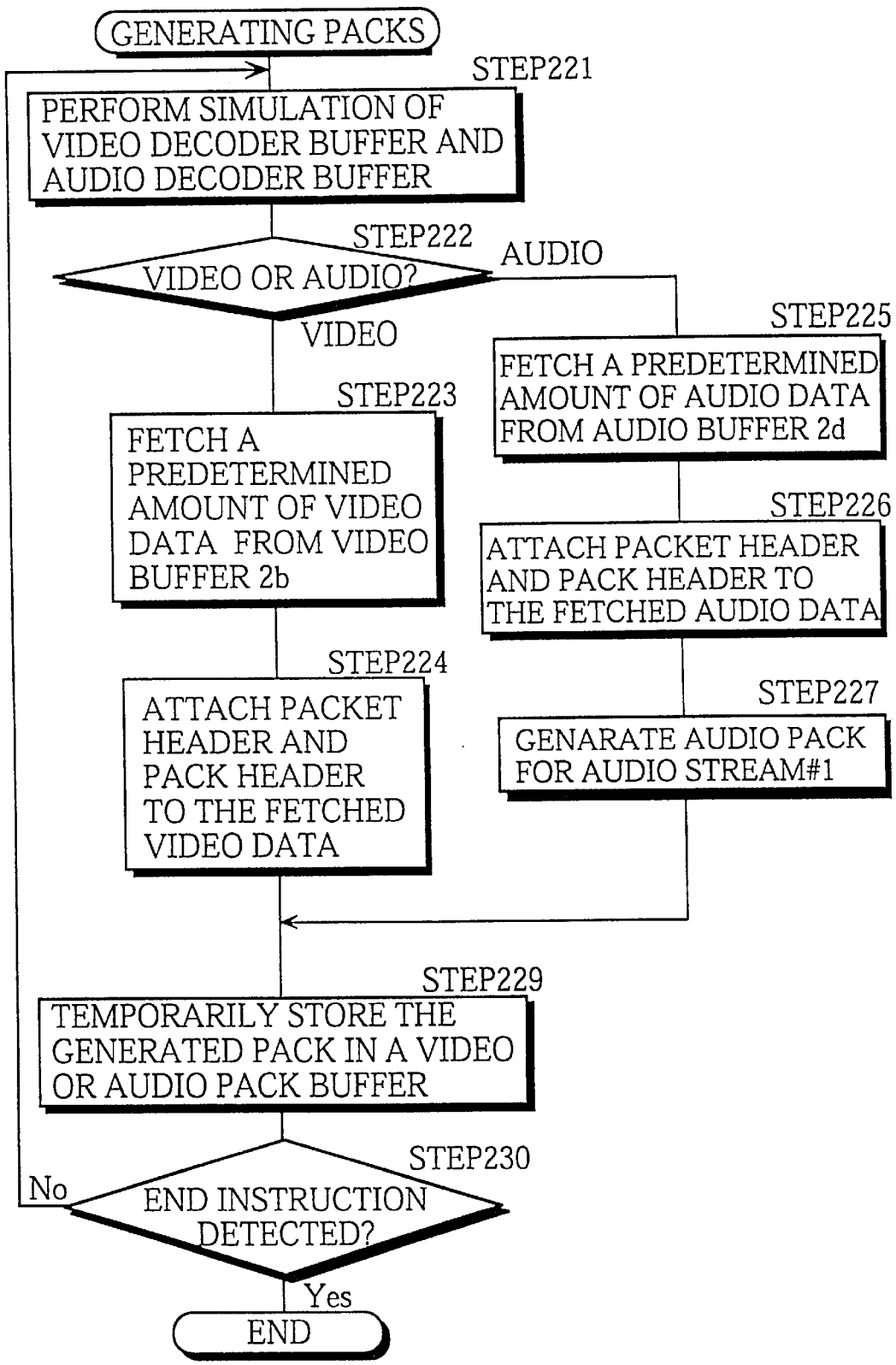
FIG. 22 is a flowchart showing the process of generating packs of the video stream and the audio stream #0 which is performed by the system encoder 2e.

FIG. 22 is a flowchart showing the process of generating packs of the video stream and the audio streams #0 and #1, the process being performed by the system encoder 2e.

The system encoder 2e, the instant when the video encoder 2a starts encoding, performs simulations of the amount of the video data and audio data respectively occupying the video decoder buffer (equivalent to the video buffer 4b shown in FIG. 18) of a reproducing apparatus and the audio decoder buffer (equivalent to the audio buffer 4d shown in FIG. 18) of the reproducing apparatus (step 221). The data stored in the payload field of each video pack is input to the video decoder buffer of the reproducing apparatus at the time indicated by the SCR. The data is fetched from the video decoder buffer at the time indicated by the DTS. The capacity of the video decoder buffer has a limit (224 KB according to the standard). Therefore, when the SCR of the pack is defined regardless of the video decoder buffer capacity, the buffer may overflow. The simulation is performed in the step 221 to check the change in the amount of the video data and audio data respectively occupying the video decoder buffer (equivalent to the video buffer 4b shown in FIG. 18) of a reproducing apparatus and the audio decoder buffer (equivalent to the audio buffer 4d shown in FIG. 18) of the reproducing apparatus, in accordance with changes in the SCR and DTS of the pack.

Figure 26:
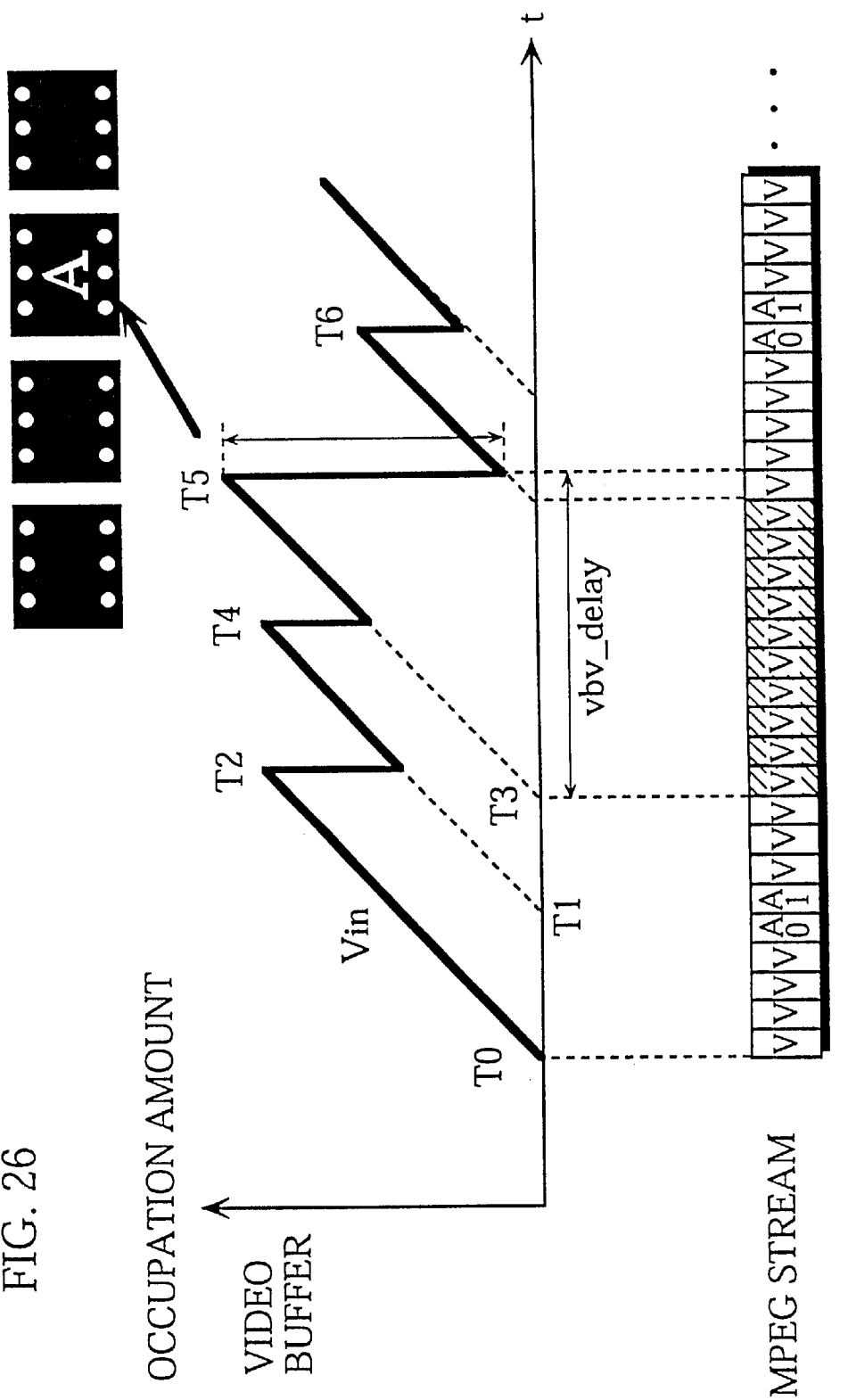
FIG. 26 shows the simulation of the video decoder buffer.

FIG. 26 shows the simulation of the video decoder buffer. In the drawing, the horizontal axis represents time, and the vertical axis the amount of video data occupying the video decoder buffer, T0 the time when the video decoder buffer starts receiving data, and Vin (the inclination of the graph) the data input bit rate. Also, T2 and T4–T6 each represent the times when data is fetched from the video decoder buffer. The drawing is written based on the presumption that data transfer from the video decoder buffer to the decoder is performed instantaneously.

The time T1 indicates the time when a certain amount of data fetched from the buffer at time T4 started being input to the buffer. Similarly, time T3 indicates the time when a certain amount of data fetched from the buffer at time T5 started being input to the buffer. The time period between the input and output of a certain amount of data to/from the video decoder buffer is called VBV delay.

The simulation of occupation of the audio decoder buffer by audio data is similar to the simulation of the video decoder buffer shown in FIG. 26. However, the audio stream has a far smaller amount of data (bit rate) than the video stream. Also, the capacity of the audio decoder buffer (4 KB according to the standard) is smaller than that of the video decoder buffer.

The system encoder 2e determines whether a pack of video data or audio data should be generated, in accordance with the amount of data stored in the video buffer 2b and the audio buffer 2d (step 222).

When determining that the pack should be a pack of video data in step 222, the system encoder 2e fetches a predetermined amount of video data (equivalent to the size of the payload field of the video packet) from the video buffer 2b (step 223), and attaches the packet header and the pack header to the fetched video data (step 224).

When determining that the pack should be a pack of audio data in step 222, the system encoder 2e fetches a predetermined amount of audio data (equivalent to the size of the payload field of the audio packet) from the audio buffer 2d (step 225), and attaches the packet header and the pack header to the fetched audio data (step 226). A pack for the audio stream #1 for dubbing is then generated from the pack for the audio stream #0. That is, the pack for the audio stream #1 is generated by copying the pack for the audio stream #0 (step 227).

The system encoder 2e stores the generated pack in a video or audio pack buffer (not illustrated) in itself (step 229). When an end instruction is not detected, control returns to the step 221 (step 230). The generated video/audio packs are stored in the video/audio pack buffers until they are fetched in the multiplexing process.

By repeating the above steps 221 to 230, the system encoder 2e sequentially generates the video/audio packs for the video stream, the audio stream #0, and the audio stream #1 respectively stored in the video buffer 2b and audio buffer 2d.

<2-3-2 Generating Packs of Audio Stream #1>

Figure 23:
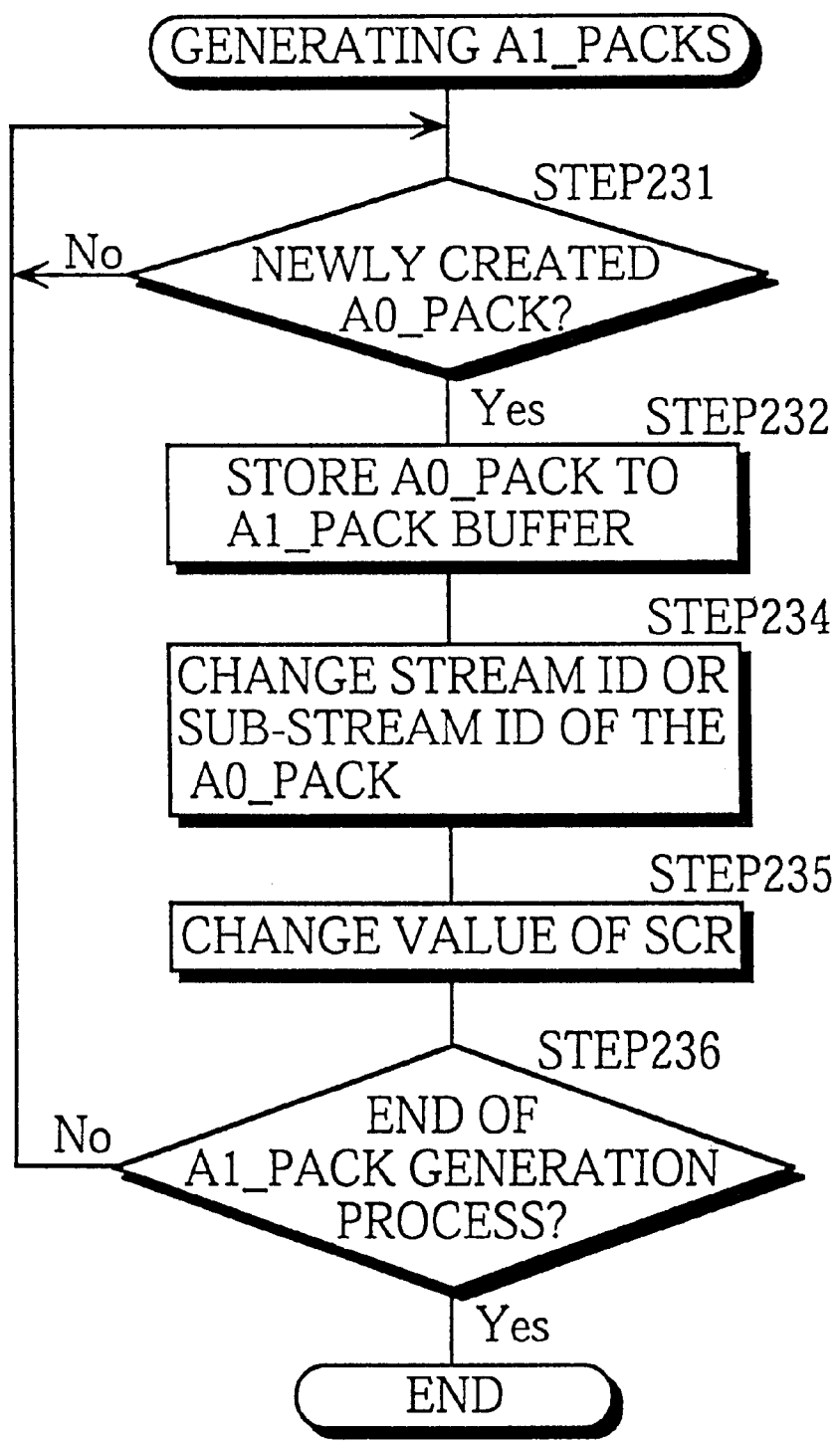
FIG. 23 is a flowchart showing the process of generating audio packs of the audio stream #1 for dubbing.

FIG. 23 is a flowchart showing the process of generating audio packs of the audio stream #1 for dubbing. That is, the drawing shows a detailed process of step 227 shown in FIG. 22.

When a newly created A0_PACK is stored in a pack buffer (not illustrated) (step 231), the system encoder 2e copies the A0_PACK to the A1_pack buffer 2e1 (step 232).

The system encoder 2e then changes the audio stream number specified by the stream ID or sub-stream ID in the A0_PACK stored in the A1_pack buffer 2e1 from #0 to #1, and changes the value of a copy/original flag from "0" to "1" (step 234). The system encoder 2e changes the value of the SCR so that the A1_PACK is located immediately after or near the A0_PACK in a VOB (step 235).

Audio packs of the audio stream #1 are generated as described above. The generated A1_PACKs are stored in the A1_pack buffer 2e1 until they are fetched in the multiplexing process.

The SCR value is changed as described above due to the following reason. If there are two packs having the same SCR, the reproducing apparatus outputs the two packs at the same time to the demultiplexor located before the audio decoder buffer. This may cause an abnormal operation of the demultiplexor.

<2-3-3 Multiplexing>

Figure 24:
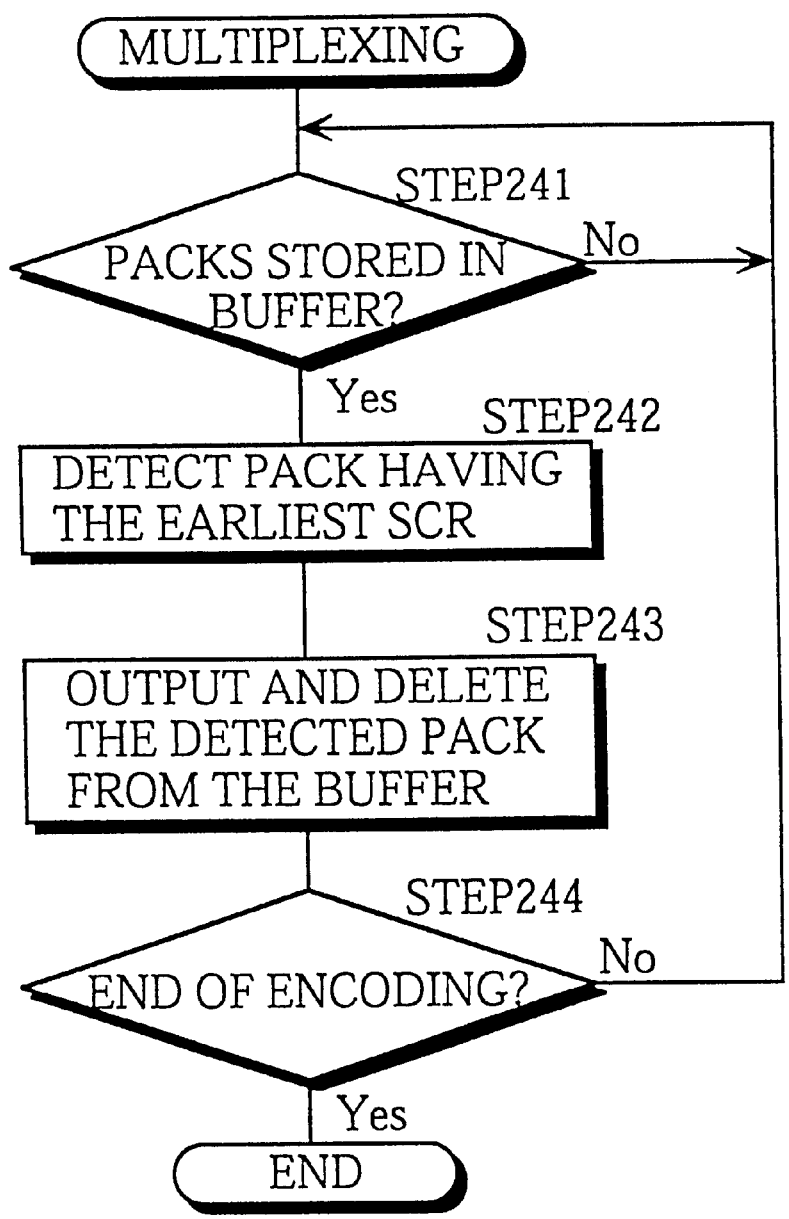
FIG. 24 is a flowchart of the multiplexing process in which the system encoder 2e multiplexes the video stream and the audio streams #0 and #1 in units of packs.

FIG. 24 is a flowchart of the multiplexing process in which the system encoder 2e multiplexes the video stream and the audio streams #0 and #1 in units of packs.

The system encoder 2e performs the multiplexing process as follows, in parallel with the generation of the video pack, A0_PACK, and A1_PACK shown in FIGS. 22 and 23.

The system encoder 2e judges whether one or more packs are stored in any of the video pack buffer, audio pack buffer, and the A1_pack buffer (step 241). When having judged that one or more packs are stored, the system encoder 2e reads the SCRs of the packs and detects a pack having the SCR with the earliest time (step 242). The system encoder 2e outputs the detected pack and deletes the pack from the buffer (step 243). By repeating these steps, the video packs, A0_packs, and A1_packs are multiplexed into one VOB in the order of time indicated by the SCR as a sequence of packs.

After one VOB is written onto the disc, the control unit 1 newly generates the VOB information and the PGC information shown in FIG. 12 and adds the generated information to the AV data management file. In the newly generated VOB information, the application flag of the audio stream #1 for dubbing is set to "same audio data." The application flag of the audio stream #0 is set to the same value as the audio stream #1. The newly generated PGC information includes a cell having a playback section ranging from the start to the end of the newly written VOB. The audio flag included in the cell specifies "audio stream #0."

<2-4 Dubbing>

When the user presses the DUBBING key on the remote controller 6 after specifying PGC, the control unit 1 is notified of it via the remote controller signal receiving unit 8 and the bus 7 shown in FIG. 16.

After receiving the above notification, the control unit 1 reads the PGC information and the VOB information from the AV data management file, and determines a VOB to be dubbed.

The control unit 1 controls the disc access unit 3 and the MPEG decoder 4 to read the determined VOB from the optical disc and reproduce it. In parallel with this, the control unit 1 controls the MPEG encoder 2 and the disc access unit 3 to modify only the audio stream #1 in the VOB read by the disc access unit 3 and to write the modified VOB onto the optical disc.

Figure 27:
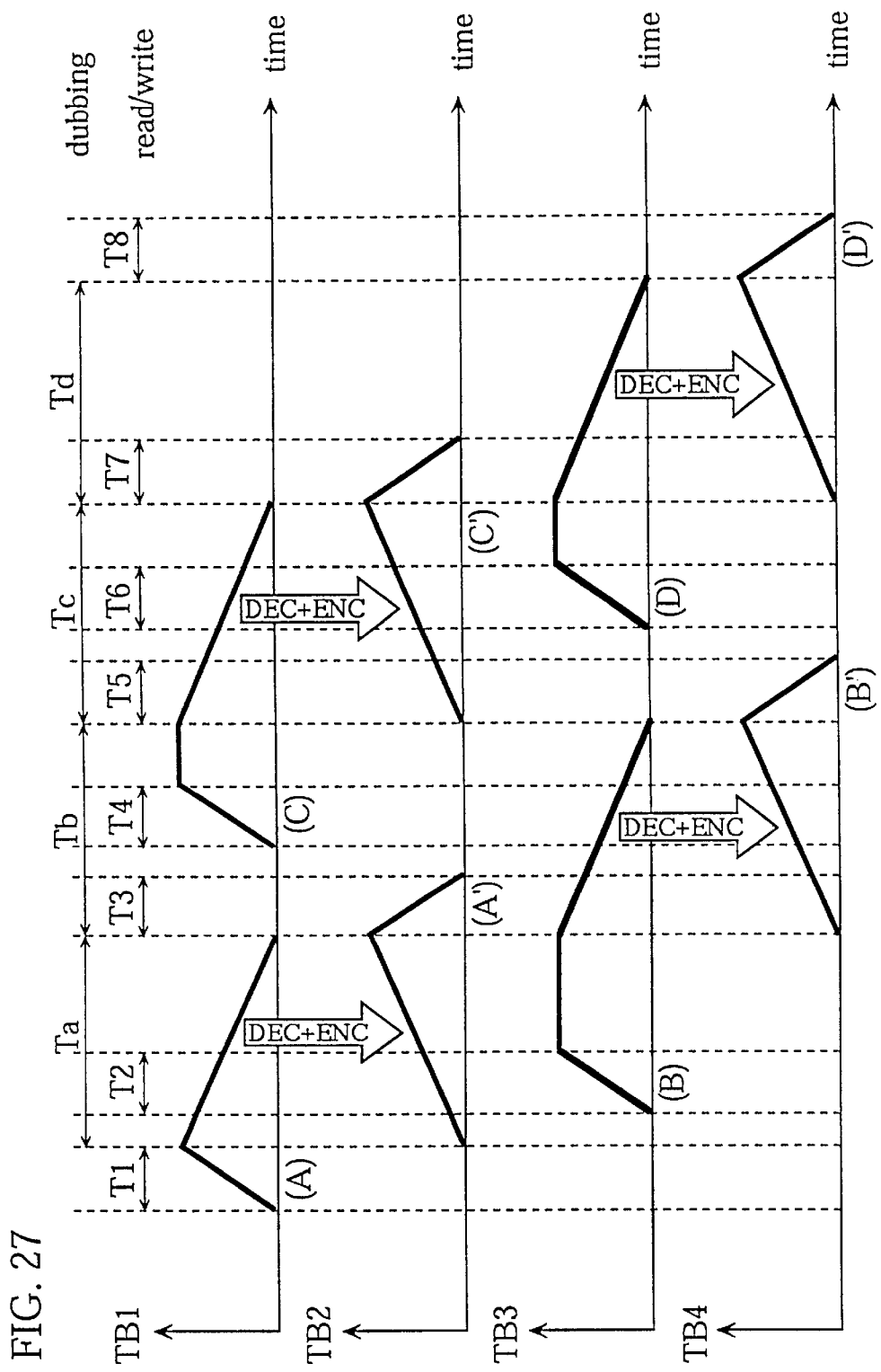
FIG. 27 shows the dubbing process with the timing when the disc access unit 3 performs reading/writing, and with the timing when the MPEG encoder 2 rewrites the audio stream #1.

FIG. 27 shows the dubbing process with the timing when the disc access unit 3 performs reading/writing, and with the timing when the MPEG encoder 2 rewrites the audio stream #1. FIG. 29 shows the control of the switches 3d and 3e shown in FIG. 21 performed by the control unit 1 with the timing shown in FIG. 27.

In FIG. 27, TB1 to TB4 respectively represent the track buffers 3a1 to 3a4 in the disc access unit 3 shown in FIG. 21. The horizontal axis represents time, and the vertical axis the amount of data occupying each track buffer.

T1, T2, T4, and T6 respectively represent the time periods during which VOBs before dubbing are read from the optical disc and stored into TB1, TB3, TB1, and TB3 via the switch 3d. T3, T5, T7, and T8 respectively represent the time periods during which VOBs after dubbing are fetched from TB2, TB4, TB2, and TB4 and written onto the optical disc via the switch 3d.

Figure 28:
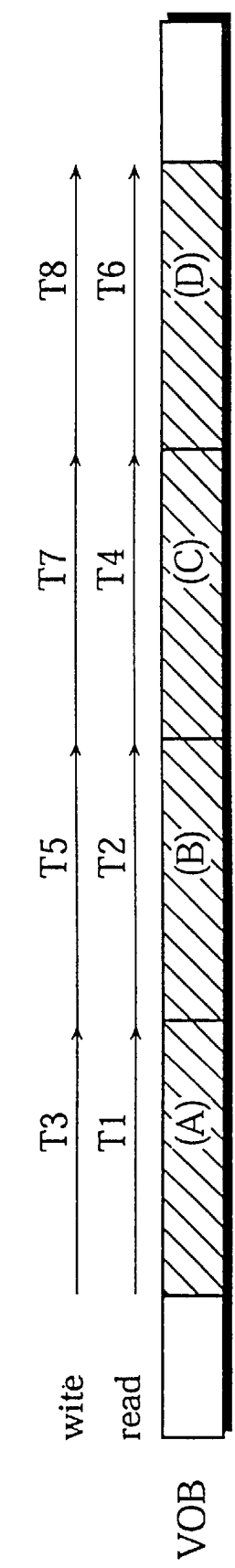
FIG. 28 shows a VOB which is read and written during the time periods shown in FIG. 27.

FIG. 28 shows a VOB which is read and written during the time periods shown in FIG. 27. For example, a section (A) of the VOB before dubbing is read during T1 and the section (A) after dubbing is written onto the disc during T3.

In FIG. 27, Ta and Tc respectively represent the time periods during which VOBs stored in TB1 are dubbed and stored into TB2. During these time periods, the dubbing unit 2h of the MPEG encoder 2 replaces the audio data stored in the payload field of each pack of the audio stream #1 with new audio data.

Tb and Td respectively represent the time periods during which VOBs stored in TB3 are dubbed and stored into TB4.

As shown in FIG. 27, there is no gap between the time periods Ta, Tb, Tc, and Td. That is, these time periods are successive. This is achieved by the control performed by the control unit 1 in which the control unit 1 alternatively connects two parts of TBs (a pair of TB1 and TB2 and a pair of TB3 and TB4) to the MPEG encoder 2 for each Ta, Tb, Tc, and Td so that the dubbing is performed, and at the same time, uses the other pair of TBs (the pair which is not used in the dubbing) to read/write data from/onto the optical disc. This enables the dubbing unit 2h of the MPEG encoder 2 to perform the dubbing consecutively in real time.

It is also possible to perform a partial dubbing by instructing the ON/OFF of the dubbing operation using the remote controller during the dubbing process. This is explained in detail. When receiving an instruction to execute the dubbing (ON) from the remote controller signal receiving unit 8 via the bus 7, the control unit 1 instructs the dubbing unit 2h of the MPEG encoder 2 to replace the audio data stored in the payload field of the current audio pack of the audio stream #1 with new audio data; when receiving an instruction to pause the dubbing (OFF), the control unit 1 instructs the dubbing unit 2h to pause replacing data.

It is also possible to return the dubbed audio stream #1 to the state before dubbing. To achieve this, the dubbing unit 2h writes the audio data stored in the payload field of each pack of the audio stream #0 over that of the audio stream #1.

Each time a VOB included in a PGC is dubbed, the control unit 1 updates the application flag of the audio stream #1 of the corresponding VOB information to "dubbing audio data," without updating the application flag of the audio stream #0. The reason for not changing the application flag of the audio stream #0 is as follows. Even after the audio stream #1 is dubbed, it is possible to return the dubbed audio stream #1 to the state before dubbing without encoding when the application flag of the audio streams #0 is "same audio data," or without re-encoding the decoded audio signal when the application flag of the audio streams #0 is "nearly same audio data." This arrangement is useful for the user. For example, when the user has failed to perform dubbing, the user can judge whether the dubbed audio stream #1 can be returned to the state before dubbing by referring to the application flag of the audio stream #0, and if it can, the user can perform the dubbing again after returning the dubbed audio stream #1 to the state before dubbing.

<2-5 Reproduction Process>

When the user presses the PLAY key on the remote controller 6, the control unit 1 is notified of it via the remote controller signal receiving unit 8 and the bus 7 shown in FIG. 16. After receiving this notification, the control unit 1 determines a VOB by reading out the PGC information and the VOB information from the AV data management file. In doing so, the control unit 1 also determines which of the audio streams #0 and #1 should be reproduced by referring to the audio flag included in the PGC information, and notifies the MPEG decoder 4 of the determination result.

The control unit 1 controls the disc access unit 3 and the MPEG decoder 4 to read the determined VOB from the optical disc and reproduce it.

With the above operation, the PGC specified by the user is reproduced.

When the user instructs the change of the audio streams operating the remote controller 6 and when the application flag of the audio stream #1 indicates "same audio data" or "nearly same audio data," the control unit 1 does not change the audio streams and instructs the video signal processing unit 5 to temporarily add guidance information to the video signal to show the user that the change of the audio stream is not available. This is because the user instructs the change expecting a different audio, while the same audio will be reproduced with the application flag indicating "same audio data" or "nearly same audio data" even if the audio stream is switched from #0 to #1, and in this case the user may misunderstand the operation to think that the DVD recorder has broken down and failed to change the audio streams.

When the user instructs the change of the audio streams operating the remote controller 6 and when the application flag of the audio stream #1 indicates "dubbing audio data" or "customized audio data," the control unit 1 instructs the MPEG decoder 4 to change the audio stream from #0 to #1.

As apparent from the above description, the VOBs recorded onto the optical disc DVD-RAM of the present embodiment each have a predetermined amount of space that can store data for dubbing. This enables the audio data to be dubbed in VOBs without re-encoding or re-locating the VOBs.

In the present embodiment, the dubbing can be performed without difficulty only by replacing audio data in the packs with other data since the above predetermined amount of space is achieved as an audio stream.

In the present embodiment, the recorder can perform the dubbing without difficulty since the same audio data as the audio stream #0 which is original is recorded in the audio stream #1 for dubbing.

The recorder can generate the audio stream for dubbing without difficulty when the same encoding mode and the same bit rate are assigned to both the audio streams #0 and #1. In this case, the recorder achieves this only by copying packs of the audio stream #0 and changing a part of the packs (the SCRs, and stream IDs or the sub-stream IDs) when recording the VOBs onto the disc.

The optical disc of the present invention can be achieved as an optical disc for Karaoke in which the audio stream #0 as original audio data and the audio stream #1 for dubbing are multiplexed into the VOBs. With this construction, the sound input through a microphone can be mixed into the original audio data recorded in the audio stream for dubbing. Also, a partial dubbing or a whole dubbing can be repeated.

In the present embodiment, each VOB includes two audio streams. However, only an audio stream for dubbing may be included in each VOB when there is no original audio stream. In such a case, soundless data may be recorded into the audio stream for dubbing, for example.

In the present embodiment, the audio stream #1 for dubbing is generated by copying the audio stream #0. However, the audio stream #1 for dubbing may be generated as a different stream (e.g., a stream other than the audio stream, or an audio stream storing soundless data).

Figure 30:
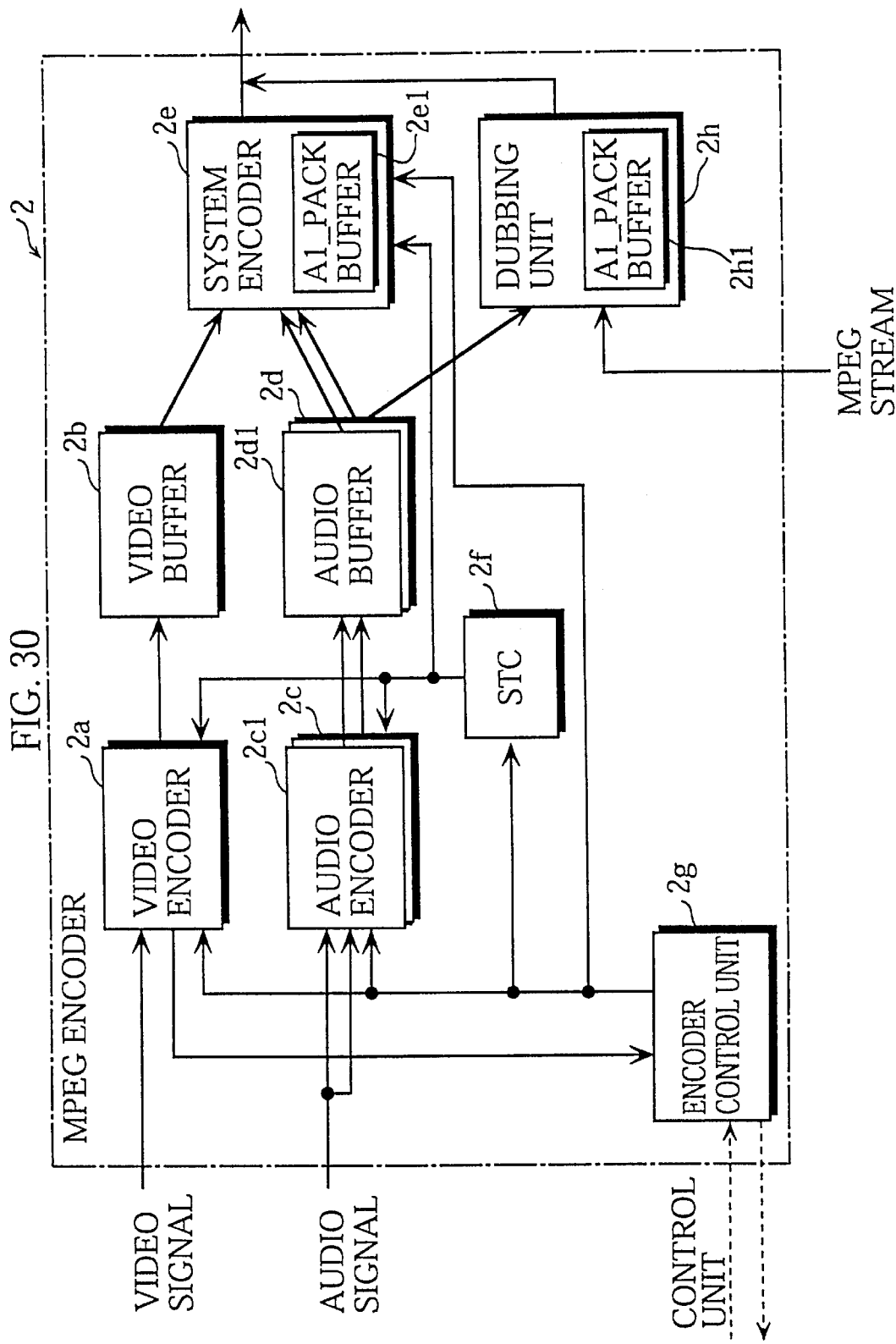
FIG. 30 shows the construction of the MPEG encoder which includes two pairs of an audio encoder and an audio buffer.

The audio stream #1 may be recorded with a different encoding mode or a different sampling frequency from the audio stream #0 in the present embodiment. This is achieved by allowing the MPEG encoder to include two pairs of an audio encoder and an audio buffer. FIG. 30 shows the construction of the MPEG encoder. Compared to the construction shown in FIG. 19, the present construction additionally includes an audio encoder 2c1 and an audio buffer 2d1. With the present construction, it is possible to record the audio stream #1 with the application flag indicating "nearly same audio data."

It is also possible to perform dubbing by replacing the audio data in the audio stream #0 in units of packs. In this case, the "Audio0 Attribute" is used to manage the state of the audio stream #0 regarding whether the stream has been dubbed or not.

In the present embodiment, the value of the copy/original flag in the A1_PACK may be changed to "0" (original) after the pack is dubbed. Also, the value of the copy/original flag in the A1_PACK may indicate differently. For example, the flag may be set to indicate "original" when it is first recorded onto the disc.

Furthermore, the reproduction time periods of the audio stream #0 and #1 may not completely match. For example, the audio stream #1 may be generated by copying the audio stream #0 by excluding a part of the stream #0 which corresponds to a reproduction time period not expected to be dubbed.

<Second Embodiment>
<1 Optical Disc>

The optical disc of Second Embodiment differs from that of First Embodiment in that a sub-picture stream for dubbing is multiplexed into VOBs. Here, the sub-picture (hereinafter referred to as SP) is a still picture superimposed on the video picture as a subtitle, textual information or the like.

The following description focuses on characteristics of the present embodiment.

Figure 31:
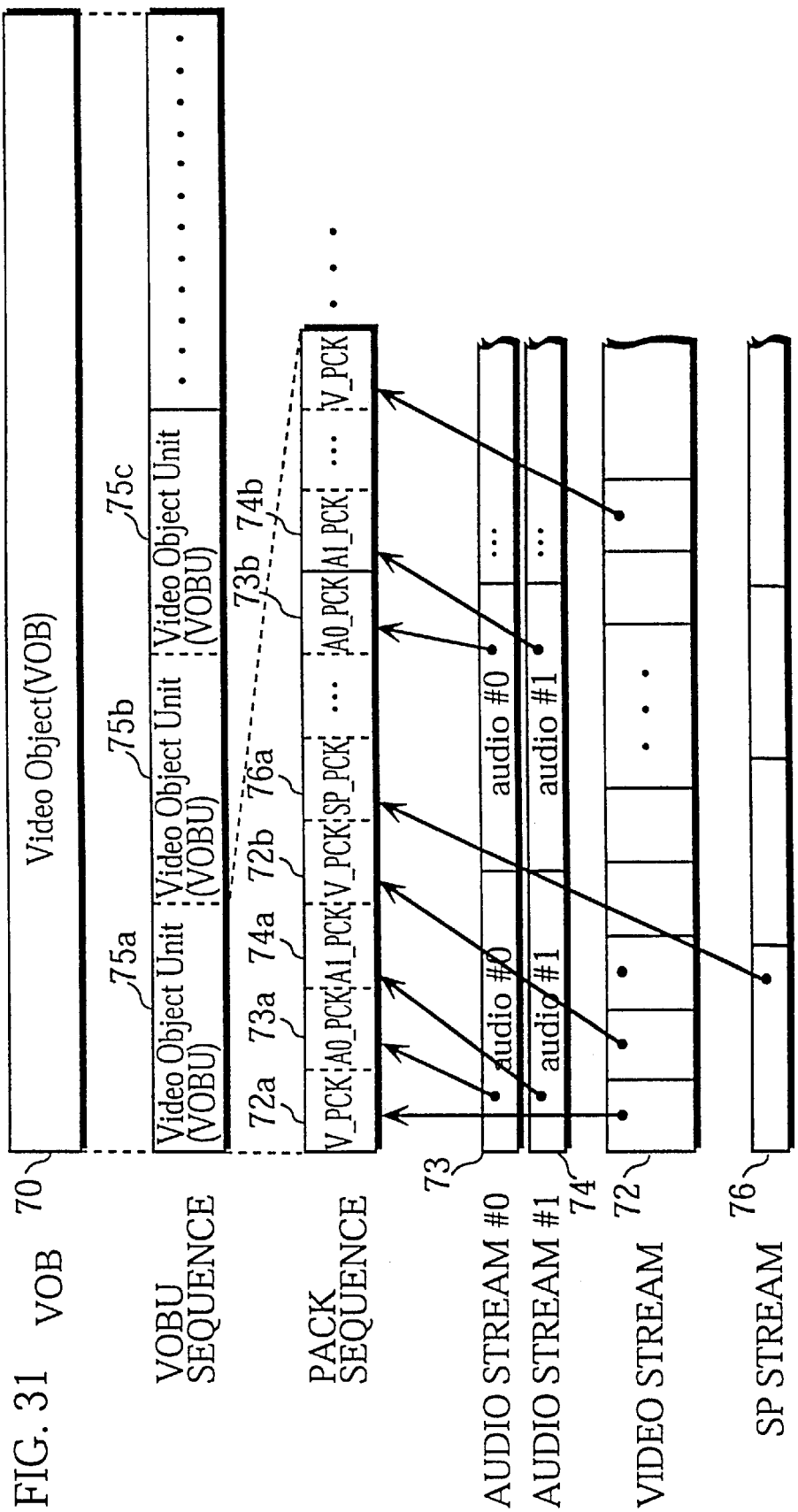
FIG. 31 shows a structure of the VOB in the second embodiment in which elementary streams are multiplexed.

FIG. 31 shows a structure of the VOB in the present embodiment in which elementary streams (video streams, audio streams, and SP streams) are multiplexed.

In the drawing, the SP stream 76 is still picture data (e.g., a code sequence generated by compressing a bit map image with the run-length encoding method) which includes a plurality of pieces of still picture data respectively corresponding to a plurality of VOBUs in the VOB. However, since the SP stream 76 is used for dubbing, the SP stream 76 is only required to have a predetermined size (e.g., a size corresponding to one half of the display screen to be displayed at the bottom of the screen) and may be composed of invalid image data when the SP stream 76 is first recorded onto the disc. As shown in the pack sequence in FIG. 31, the SP stream 76 is multiplexed into the VOB as packs together with the video stream and the audio streams #0 and #1.

SP packs in a VOBU are effective during the reproduction period of the VOBU. That is, image data of at least one still picture is distributed over one VOBU as SP packs and is superimposed on the video image during the reproduction period of the VOBU.

Figure 32:
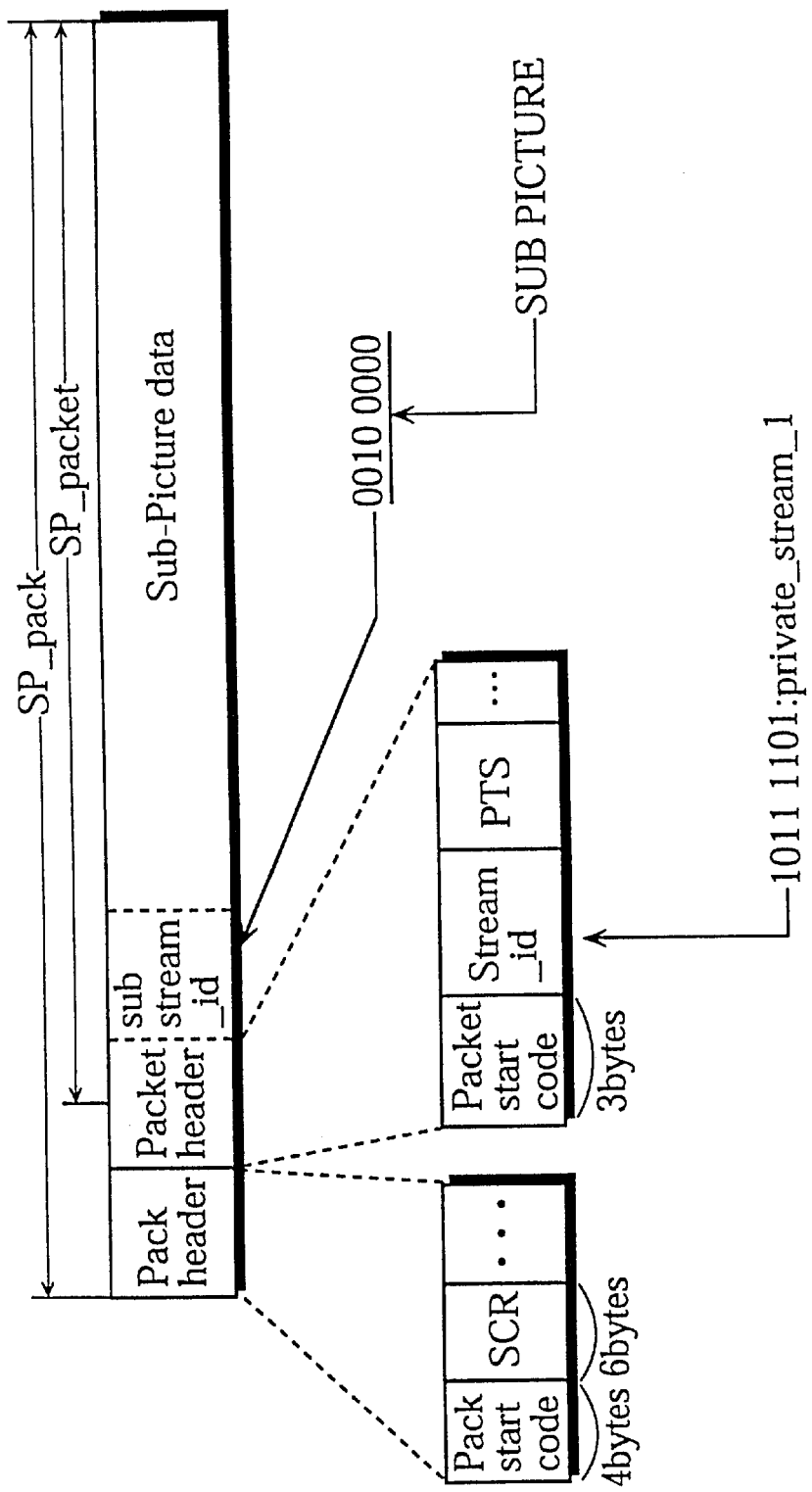
FIG. 32 shows a data format of the sub-picture pack.

FIG. 32 shows a data format of the SP pack. In the drawing, the sub-stream ID "0010 0000" indicates the SP pack. The other elements of the data format is the same as the data format shown in FIGS. 10 and 11.

Figure 33:
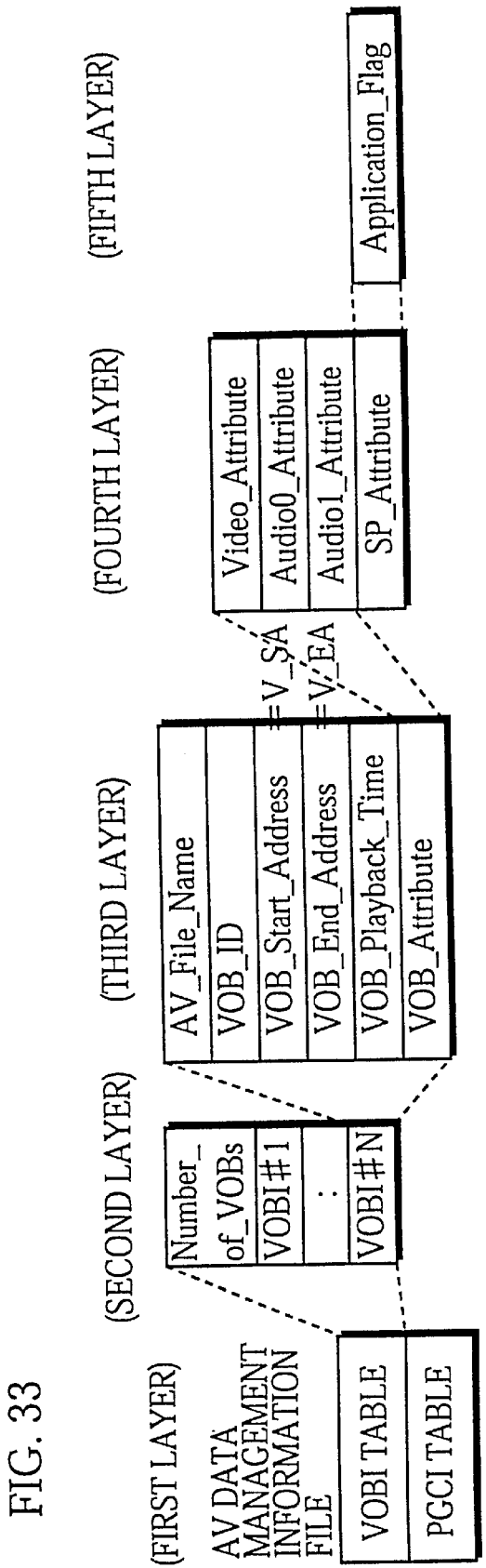
FIG. 33 hierarchically shows the data structure of the AV data management file.

FIG. 33 hierarchically shows the data structure of the AV data management file. The present data structure is different from that shown in FIG. 12 in that it additionally has an SP attribute.

As shown in the fourth and fifth layers, the SP attribute includes an application flag. The present application flag may be different from that in the First Embodiment. That is, the value of the "Application Flag" indicates either "dubbed" or "not dubbed." However, when only one SP stream is multiplexed into a VOB, the application flag is set to "customized SP data" when the SP stream is first recorded onto the disc, and the application flag is set to "dubbing SP data" when the dubbing is performed on the SP stream.

<2 Optical Disc Recording/Reproducing Apparatus>

The optical disc recording/reproducing apparatus (hereinafter referred to as recorder) in the present embodiment differs from that in the First Embodiment in that it includes MPEG encoder 12 and MPEG decoder 14 instead of MPEG encoder 2 and MPEG decoder 4. The following description focuses on characteristics of the present embodiment.

Figure 34:
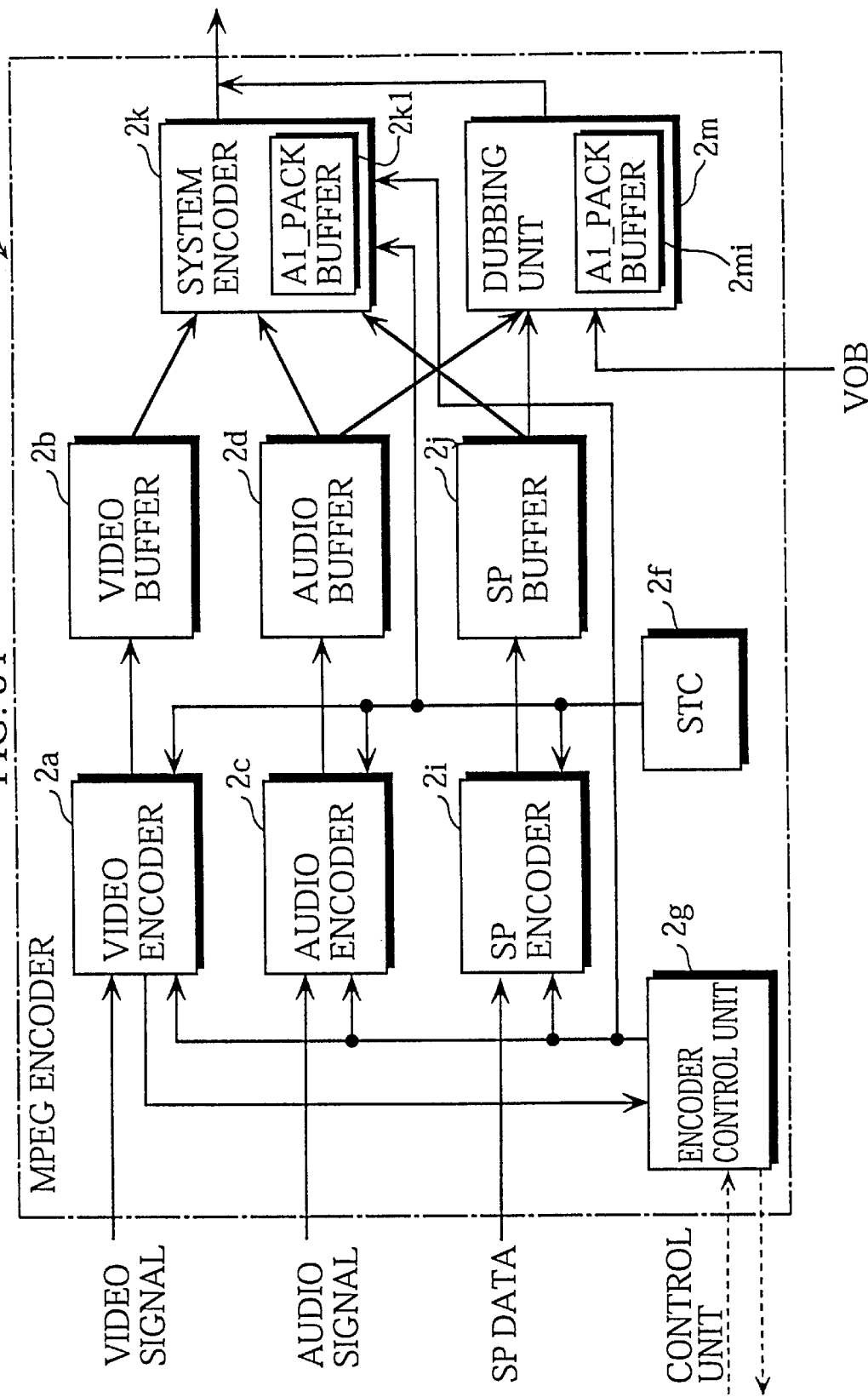
FIG. 34 is a block diagram showing the construction of the MPEG encoder 12.

FIG. 34 is a block diagram showing the construction of the MPEG encoder 12. Compared to the construction of the MPEG encoder 2 shown in FIG. 19, the present construction includes an SP encoder 2i and an SP buffer 2j, and includes a system encoder 2k and a dubbing unit 2m instead of the system encoder 2e and the dubbing unit 2h.

The SP encoder 2i generates the SP stream by encoding SP data for each VOBU with the run-length encoding method.

The SP buffer 2j temporarily stores the contents of the SP stream generated by the SP encoder 2i in sequence.

The system encoder 2k has a function to generate SP packs of the SP stream for dubbing when the VOB is recorded onto the disc, as well as the functions of the system encoder 2e. That is, the system encoder 2k generates SP packs corresponding to a predetermined size of still picture data for each VOBU. In doing so, invalid data may be included in the SP packs. The generated SP packs are multiplexed into the VOB together with the video packs and the audio packs (A0_PCKs and A1_PCKs). Alternatively, the contents of the SP stream stored in the SP buffer may be converted to packs and multiplexed into the VOB in sequence.

The dubbing unit 2m has, as well as the functions of the dubbing unit 2h, a function to replace, for each VOBU, the data stored in the payload field of the SP PACKs with the contents of the SP stream stored in the SP buffer. For this purpose, the dubbing unit 2m has a pack buffer 2m1 for storing the SP packs of the VOB used for the above replacement.

Figure 35:
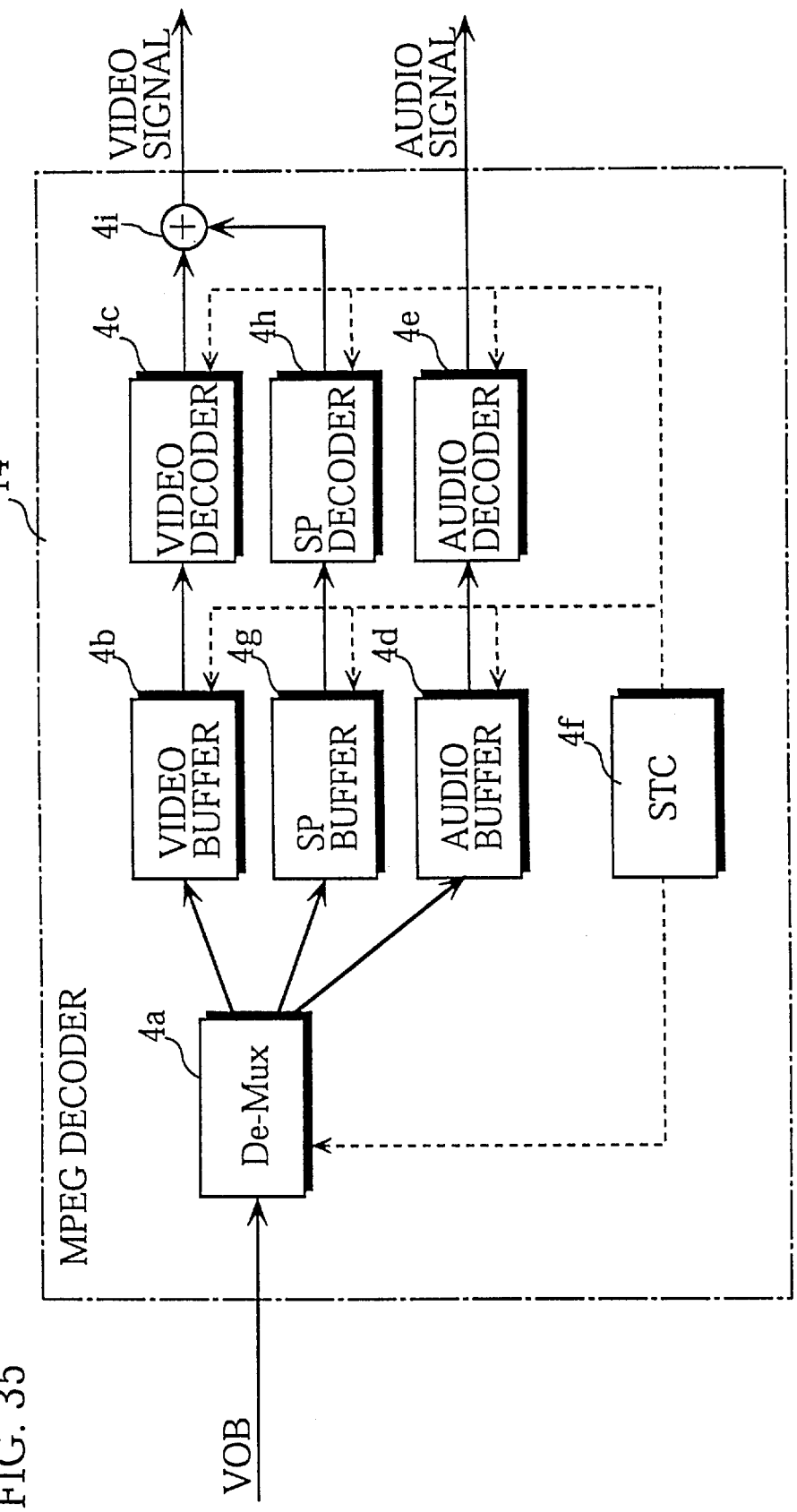
FIG. 35 is a block diagram showing the construction of the MPEG decoder 14.

FIG. 35 is a block diagram showing the construction of the MPEG decoder 14. Compared to the construction of the MPEG decoder 4 shown in FIG. 18, the present construction includes an SP buffer 4g, an SP decoder 4h, and a combining unit 4i.

The SP buffer 4g temporarily stores the SP packs having been separated from the VOB by the demultiplexor 4a.

The SP decoder 4h decodes the data (having been encoded with the run-length encoding method) in the SP packs transferred from the SP buffer 4g.

The combining unit 4i combines the video data output from the video decoder 4c with the still picture data output from the SP decoder so that the still pictures are superimposed on the video images.

As apparent from the above description, the VOBs recorded onto the optical disc of the present embodiment each have a predetermined amount of space that can store sub-picture data for dubbing. This enables the sub-pictures to be dubbed in VOBs without re-encoding or re-locating the VOBs.

In the present embodiment, only one SP stream for dubbing is multiplexed into each VOB. However, two SP streams may be multiplexed into each VOB as two audio streams are multiplexed in the First Embodiment.

In the present embodiment, three types of audio encoding modes: MPEG audio, AC-3, and linear PCM are used. However, not limited to these modes, other encoding modes can be adopted.

In the present embodiment, it is described that one pack includes one packet. However, one pack may include a plurality of packets.

In the present embodiment, DVD-RAM is used as a recording medium. However, not limited to this, other rewriteable media such as MO or HDD can be used to obtain the same effects.

The present invention has been fully described by way. of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A readable and writable optical disc accessible by an apparatus that performs writing, of a video object said readable and writable optical disc comprising:
    a data area for storing a video object, said the video object comprising:
        a video stream obtained by encoding a video signal;
        a first audio stream obtained by encoding an audio signal, and having a bit rate, the first audio stream comprising a number of packs each having a fixed data size; and
        a second audio stream obtained based on the first audio stream, and having the same bit rate as the first audio stream, the second audio stream comprising the same number of packs as the first audio stream and each pack of the second audio stream having the same fixed data size as each of the packs of the first audio stream, such that the second audio stream is capable of being subsequently dubbed with audio data whose contents differ from contents of audio data of the first audio stream, by the apparatus
        wherein the video stream and the first and second audio streams are multiplexed with each other; and the video object further comprises identification flags for respectively identifying the first and second audio streams.

2. The readable and writable optical disc of claim 1, wherein the identification flags identify the first and second audio streams when a part or all of the second audio stream is replaced with a part or all of the first audio stream so that the first and second audio streams have the same audio data.

3. The readable and writable optical disc of claim 1, wherein
    each of the first and second audio streams includes a plurality of reproduction sections respectively associated with time stamps which each specify a presentation time of a corresponding one of the reproduction sections, and
    the time stamps in the second audio stream provide an indication enabling the second audio stream to be presented from a same start reproduction time to a same end reproduction time as the first audio stream.

* * * * *

UNITED STATES PATENT AND TRADEMARK OFFICE
CERTIFICATE OF CORRECTION

PATENT NO.    : 6,678,466 B2
DATED         : January 13, 2004
INVENTOR(S)   : Tomotaka Yagi et al.

It is certified that error appears in the above-identified patent and that said Letters Patent is hereby corrected as shown below:

Column 14,
Line 48, please replace "VOBS" with -- VOBs --.

Column 15,
Line 62, please replace "a, playback" with -- a playback --.

Column 21,
Line 66, please replace "audio,pack" with -- audio pack --.

Column 26,
Line 9, please replace "a,VOBU" with -- a VOBU --.

Column 28,
Line 3, please replace "writing, of a video object" with -- writing of a video object, --.
Line 5, please replace "said the video" with -- the video --.
Line 21, please replace "stream, by the apparatus" with -- stream by the apparatus, --.

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO.    : 6,678,466 B2
DATED         : January 13, 2004
INVENTOR(S)   : Tomotaka Yagi et al.

It is certified that error appears in the above-identified patent and that said Letters Patent is hereby corrected as shown below:

Column 23,
Line 45, please replace "two parts" with -- two pairs --.

Signed and Sealed this

Thirty-first Day of May, 2005

JON W. DUDAS
*Director of the United States Patent and Trademark Office*